(12) United States Patent
Lee

(10) Patent No.: US 10,608,472 B2
(45) Date of Patent: Mar. 31, 2020

(54) WIRELESS POWER TRANSMISSION DEVICE, WIRELESS POWER RECEPTION DEVICE, AND WIRELESS CHARGING SYSTEM

(71) Applicant: LG ELECTRONICS INC., Seoul (KR)

(72) Inventor: Seonghun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 431 days.

(21) Appl. No.: 15/527,162

(22) PCT Filed: Feb. 6, 2015

(86) PCT No.: PCT/KR2015/001218
§ 371 (c)(1),
(2) Date: May 16, 2017

(87) PCT Pub. No.: WO2016/080594
PCT Pub. Date: May 26, 2016

(65) Prior Publication Data
US 2017/0353054 A1     Dec. 7, 2017

Related U.S. Application Data

(60) Provisional application No. 62/081,292, filed on Nov. 18, 2014.

(30) Foreign Application Priority Data

Feb. 6, 2015    (KR) .................. 10-2015-0018356

(51) Int. Cl.
*H02J 50/12*      (2016.01)
*H04B 5/00*      (2006.01)
(Continued)

(52) U.S. Cl.
CPC ............ *H02J 50/12* (2016.02); *H02J 5/00* (2013.01); *H02J 7/00* (2013.01); *H02J 7/025* (2013.01);
(Continued)

(58) Field of Classification Search
CPC .. H02J 50/12; H02J 7/025; H02J 50/80; H02J 50/40; H02J 7/00; H02J 5/00; H02J 5/005;
(Continued)

(56) References Cited

U.S. PATENT DOCUMENTS 3,742,179 A * 6/1973 Harnden, Jr. .......... H05B 6/062
219/627
4,996,405 A * 2/1991 Poumey ............... H05B 6/1236
219/622

(Continued)

FOREIGN PATENT DOCUMENTS

DE     102009029250 A1    3/2011
EP        2725682 A1    4/2014
(Continued)

*Primary Examiner* — Jared Fureman
*Assistant Examiner* — Michael J Warmflash
(74) *Attorney, Agent, or Firm* — Birch, Stewart, Kolasch & Birch, LLP

(57) ABSTRACT

The present invention relates to a wireless power transmission device, a wireless power reception device, and a wireless charging system in a wireless power transmission field. The wireless power transmission device according to the present invention comprises: a power conversion unit having a plurality of transmission coils formed to transmit wireless power; a first communication module for sensing a wireless power reception device located in any one of power transmission areas respectively corresponding to the plurality of transmission coils; a second communication module for transmitting/receiving, through the first communication module, a power control message to/from the wireless
(Continued)

power reception device, by corresponding to the sensing of the wireless power reception device located in any one power transmission area; and a control unit for transmitting, on the basis of the power control message, wireless power to the wireless power reception device located in any one power transmission area through a transmission coil arranged to correspond to any one power transmission area.

15 Claims, 23 Drawing Sheets

(51) Int. Cl.
*H02J 7/02* (2016.01)
*H05B 6/12* (2006.01)
*H02J 50/80* (2016.01)
*H02J 5/00* (2016.01)
*H02J 7/00* (2006.01)
*H02J 50/40* (2016.01)

(52) U.S. Cl.
CPC .............. *H02J 50/40* (2016.02); *H02J 50/80* (2016.02); *H04B 5/0037* (2013.01); *H05B 6/1236* (2013.01); *Y02B 40/123* (2013.01)

(58) Field of Classification Search
CPC .. H04B 5/0037; H04B 5/0075; Y02B 40/123; H05B 6/1236; G08B 7/06
See application file for complete search history.

(56) References Cited

U.S. PATENT DOCUMENTS

| | | | | |
|---|---|---|---|---|
| 5,231,265 A * | 7/1993 | Hackett | ................... | G01M 1/30 219/494 |
| 5,648,008 A * | 7/1997 | Barritt | .................... | H05B 6/062 219/626 |
| 7,355,150 B2 * | 4/2008 | Baarman | ................ | A47J 36/321 219/620 |
| 8,519,310 B2 * | 8/2013 | Pinkert | .................... | F24C 7/082 219/553 |
| 9,647,481 B2 * | 5/2017 | Huang | .................. | G06F 1/1632 |
| 2003/0164370 A1 * | 9/2003 | Aihara | ................. | H05B 6/1218 219/622 |
| 2007/0221668 A1 * | 9/2007 | Baarman | ................. | H05B 6/062 219/746 |
| 2010/0000980 A1 * | 1/2010 | Popescu | .................. | A47J 36/20 219/201 |
| 2011/0056215 A1 * | 3/2011 | Ham | ....................... | H01F 38/14 62/3.7 |
| 2013/0278209 A1 | 10/2013 | Von Novak, III et al. | | |
| 2014/0117928 A1 | 5/2014 | Liao | | |
| 2014/0152235 A1 | 6/2014 | Huang et al. | | |
| 2015/0022147 A1 * | 1/2015 | Jung | ....................... | H02J 5/005 320/108 |
| 2015/0163864 A1 * | 6/2015 | Baarman | ................. | H02J 5/005 99/358 |
| 2016/0118808 A1 * | 4/2016 | Van Wageningen | ........................ | H05B 6/1236 307/104 |
| 2016/0294219 A1 * | 10/2016 | Van Wageningen | .... | H02J 50/12 |
| 2019/0032922 A1 * | 1/2019 | Yoshino | .................. | H02J 50/80 |

FOREIGN PATENT DOCUMENTS

| | | |
|---|---|---|
| KR | 10-2013-0096326 A | 8/2013 |
| KR | 10-2013-0099699 A | 9/2013 |
| KR | 10-2014-0124706 A | 10/2014 |
| WO | WO 2011/032047 A1 | 3/2011 |

* cited by examiner (a)

| | b7 | b6 | b5 | b4 | b3 | b2 | b1 | b0 | 5400 |
|---|---|---|---|---|---|---|---|---|---|
| B0 | HEADER (5420) ||||||||  |
| B1 | POWER CLASS (5431) | MAXIMUM POWER (5432) ||||||| 5430 |
| B2 | RESERVED ||||||||  |
| B3 | PROP (5433) | RESERVED ||| COUNT (5434) ||||  |
| B4 | RESERVED ||||||||  |
| B5 |  ||||||||  |

FIG. 17

| | b7 | b6 | b5 | b4 | b3 | b2 | b1 | b0 | 5500 |
|---|---|---|---|---|---|---|---|---|---|
| B0 | HEADER (5520) ||||||||  |
| B1 | CONTROL ERROR VALUE (5530) ||||||||  |

FIG. 18

| | b7 | b6 | b5 | b4 | b3 | b2 | b1 | b0 | 5600 |
|---|---|---|---|---|---|---|---|---|---|
| B0 | HEADER (5620) ||||||||  |
| B1 | END POWER TRANSFER CODE (5630) ||||||||  |

ELECTRIC DEVICE 'A' IS OUT OF SECOND POWER TRANSMISSION AREA. PLEASE CHECK.

WIRELESS POWER TRANSMISSION DEVICE, WIRELESS POWER RECEPTION DEVICE, AND WIRELESS CHARGING SYSTEM

CROSS REFERENCE TO RELATED APPLICATIONS

This application is the National Phase of PCT International Application No. PCT/KR2015/001218, filed on Feb. 6, 2015, which claims priority under 35 U.S.C. 119(e) to U.S. Provisional Application No. 62/081,292, filed on Nov. 18, 2014 and under 35 U.S.C. 119(a) to Patent Application No. 10-2015-0018356, filed in the Republic of Korea on Feb. 6, 2015, all of which are hereby expressly incorporated by reference into the present application.

BACKGROUND OF THE INVENTION

1. Field of the Invention

The present disclosure relates to a wireless power transmission device, and a control method thereof.

2. Description of the Related Art

Instead of a method of traditionally supplying electric energy to wireless power reception devices in a wired manner, in recent years, a method of supplying electric energy to wireless power reception devices without contact in a wireless manner has been used. The wireless power reception device that receives energy in a wireless manner may be directly driven by the received wireless power, or a battery may be charged using the received wireless power so as to allow the wireless power reception device to be driven by the charged power.

The Wireless Power Consortium (WPC) which manages technologies for a magnetic inductive wireless power transmission has published a standard document "System description Wireless power transmission, Volume 1, Low Power, Part 1: Interface Definition, Version 1.00 Release Candidate 1 (RC1)" for interoperability in the wireless power transmission on Apr. 12, 2010.

This version 1.00 relates to the low power of 5 W power transmission and reception, which has been applied mainly to mobile terminals. In recent years, application of wireless power transmission technology to household appliances that require power of several tens of watts or more in addition to low-power products has been examined.

On the other hand, the Power Matters Alliance as another technology standardization consortium has been established in March 2012, developed a product line of interface standards, and published a standard document based on an inductive coupling technology to provide inductive resonant power.

The foregoing wireless charging method using electromagnetic induction is frequently encountered in our lives. For example, the wireless charging method using electromagnetic induction has been commercialized and used in electric toothbrushes, wireless coffee ports and the like.

In recent years, there has been a need for development of a power transmission method and a device thereof for transmitting and receiving power in a wireless manner in the field of kitchen equipment requiring medium electric power.

On the other hand, the process of checking a reception device capable of radiating high power current signals from time to time to receive wireless power, such as devices for transferring and receiving such medium electric power may cause difficulty in implementation even in terms of system as well as not satisfy electromagnetic regulations. As a result, moreover, a communication method for efficiently performing communication between a transmission device for transmitting power in a wireless manner and a kitchen device for receiving wireless power from such a transmission device, namely, a wireless power reception device, may be taken into consideration.

SUMMARY OF THE INVENTION

An object of the present disclosure is to provide a wireless power transmission device, a wireless power reception device, and a wireless charging system for medium power.

Another object of the present disclosure is to provide a wireless power transmission device, a wireless power reception device, and a wireless charging system that can be used in household appliances used at home.

Still another object of the present disclosure is to provide a method for performing communication between a wireless power transmission device and a wireless power reception device while minimizing standby power.

A wireless power transmission device according to the present disclosure may include a power conversion unit provided with a plurality of transmission coils configured to transmit wireless power; a first communication module configured to sense a wireless power reception unit located in any one of power transmission areas corresponding to the plurality of transmission coils, respectively; a second communication module configured to transmit and receive a power control message to and from the wireless power reception device in response to the sensing of the wireless power reception device located in any one of the power transmission areas through the first communication module; and a control unit configured to transfer wireless power to the wireless power reception device located in any one of power transmission areas through a transmission coil disposed to correspond to the any one of power transmission areas based on the power control message.

According to an embodiment, the first communication module may be an NFC (Near Field Communication) communication module using a short-range communication method, and the second communication module may be a Bluetooth® communication module capable of communicating with a wireless power reception device in a short-range communication network.

According to an embodiment, the first communication module may be provided in the power transmission areas, respectively, to sense a wireless power reception device located in the relevant power transmission area.

According to an embodiment, when a first wireless power reception device is located in a first power transmission area in which a first transmission coil among the plurality of transmission coils is disposed, the control unit may recognize the first wireless power reception device through communication with the first communication module and an NFC tag provided in the first wireless power reception device, and control the second communication module to transmit and receive the power control message to and from the first wireless power reception device when the recognition of the first wireless power reception device is completed, and control the power conversion unit to transfer wireless power corresponding to power amount information based on the power amount information of the first wireless power reception device contained in the power control message.

According to an embodiment, the control unit may check whether the first wireless power reception device is located in the first power transmission area at preset periods using the first communication module in a state of transmitting wireless power to the first wireless power reception device.

According to an embodiment, the control unit may check whether the first wireless power reception device is located in the first power transmission area through the steps of receiving a Bluetooth address of a wireless power reception device located in the first power transmission area at the preset periods; and comparing the received Bluetooth address with a Bluetooth address of the counterpart device in communication with the second communication module.

According to an embodiment, when the Bluetooth address of the wireless power reception device located in the first power transmission area is different from the Bluetooth address of the counterpart device in communication with the second communication module through the first communication module, the control unit may determine that the first wireless power reception device is not located in the first power transmission area.

According to an embodiment, when the Bluetooth address of the wireless power reception device located in the first power transmission area is not received through the first communication module, the control unit may determine that the first wireless power reception device is not located in the first power transmission area.

According to an embodiment, when the first wireless power reception device is not located in the first power transmission area as a result of the check, the control unit may terminate communication between the second communication module and the first wireless power reception device and wireless power transmission through the first transmission coil.

According to an embodiment, when the first wireless power reception device is not sensed in the first power transmission area for a preset period of time after it is determined that the first wireless power reception device is not located in the first power transmission area, the control unit may terminate communication between the second communication module and the first wireless power reception device and wireless power transmission through the first transmission coil.

According to an embodiment, the control unit may check whether a wireless power reception device is in a second power transmission area different from the first power transmission area while at the same time checking whether the first wireless power reception device is located in the first power transmission area at the preset periods.

According to an embodiment, when the first wireless power reception device is located in the second power transmission area as a result of the check, the control unit may control the power conversion unit to transfer power to the first wireless power reception device through a second transmission coil located to correspond to the second power transmission area.

According to an embodiment, the wireless power transmission device may further include an output unit configured to output at least one of visual information and auditory information, wherein when the first wireless power reception device is not located in the first power transmission area as a result of the check, the control unit outputs notification information for notifying that the first wireless power device is out of the first power transmission area.

According to an embodiment, the control unit may check whether the wireless power reception device is located in the power transmission area using the first communication module in a standby mode in which the power conversion unit and the second communication module are deactivated.

According to an embodiment, when the wireless power reception device is located in the power transmission area as a result of the check, the control unit may switch the standby mode to a wakeup mode in which the power conversion unit and the second communication module are activated.

The present disclosure may sense that a wireless power reception device is located in a wireless power transmission area through a short-range communication module, and in response thereto, perform communication for wireless power transmission to the wireless power reception device. As described above, a wireless power transmission device may sense a wireless power reception device through short-range communication, and then proceeds with a process for wireless power transmission, and thus it may not be required to radiate a high power current until the wireless power reception device is sensed. Accordingly, it may be possible to minimize the standby power of the wireless power transmission device.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 14, 15A, 15B, and 16 through 18 are views illustrating the structure of packets including a power control message between the wireless power transmission device and the wireless power reception device;

DETAILED DESCRIPTION OF THE INVENTION

Figure 1:
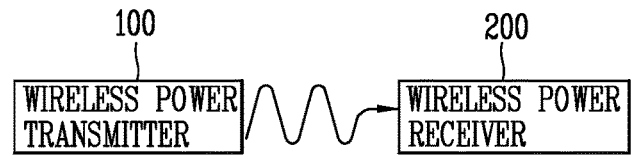
FIG. 1 is an exemplary view conceptually illustrating a wireless power transmission device and an electronic device according to the embodiments of the present invention.

The technologies disclosed herein may be applicable to wireless power transmission. However, the technologies disclosed herein are not limited to this, and may be also applicable to all kinds of power transmission systems and methods, wireless charging circuits and methods to which the technological spirit of the technology can be applicable, in addition to the methods and apparatuses using power transmitted in a wireless manner.

It should be noted that technological terms used herein are merely used to describe a specific embodiment, but not to limit the present invention. Also, unless particularly defined otherwise, technological terms used herein should be construed as a meaning that is generally understood by those having ordinary skill in the art to which the invention pertains, and should not be construed too broadly or too narrowly. Furthermore, if technological terms used herein are wrong terms unable to correctly express the spirit of the invention, then they should be replaced by technological terms that are properly understood by those skilled in the art. In addition, general terms used in this invention should be construed based on the definition of dictionary, or the context, and should not be construed too broadly or too narrowly.

Incidentally, unless clearly used otherwise, expressions in the singular number include a plural meaning. In this application, the terms "comprising" and "including" should not be construed to necessarily include all of the elements or steps disclosed herein, and should be construed not to include some of the elements or steps thereof, or should be construed to further include additional elements or steps.

In addition, a suffix "module" or "unit" used for constituent elements disclosed in the following description is merely intended for easy description of the specification, and the suffix itself does not give any special meaning or function.

Furthermore, the terms including an ordinal number such as first, second, etc. can be used to describe various elements, but the elements should not be limited by those terms. The terms are used merely for the purpose to distinguish an element from the other element. For example, a first element may be named to a second element, and similarly, a second element may be named to a first element without departing from the scope of right of the invention.

Hereinafter, preferred embodiments of the present invention will be described in detail with reference to the accompanying drawings, and the same or similar elements are designated with the same numeral references regardless of the numerals in the drawings and their redundant description will be omitted.

In describing the present invention, moreover, the detailed description will be omitted when a specific description for publicly known technologies to which the invention pertains is judged to obscure the gist of the present invention. Also, it should be noted that the accompanying drawings are merely illustrated to easily explain the spirit of the invention, and therefore, they should not be construed to limit the spirit of the invention by the accompanying drawings.

Definition

Many-to-one communication method: A method of communicating between one transmitter (Tx) and many receivers (Rx).

Unidirectional communication method: A communication method of transmitting a required message only from a receiver to a transmitter.

Bidirectional communication method: A communication method of transmitting a message from a transmitter to a receiver, from the receiver to the transmitter, namely, from both sides.

Here, the transmitter and the receiver indicate the same as a transmission unit (device) and a reception unit (device), respectively. Hereinafter, those terms may be interchangeably used.

Conceptual View of Wireless Power Transmission Device and Wireless Power Reception Device FIG. 1 is an exemplary view conceptually illustrating a wireless power transmission device and a wireless power reception device according to the embodiments of the present invention.

Referring to FIG. 1, the wireless power transmission device 100 may be a power transfer apparatus configured to transfer power required for the wireless power reception device 200 in a wireless manner.

Furthermore, the wireless power transmission device 100 may be a wireless charging apparatus configured to charge a battery of the wireless power reception device 200 by transferring power in a wireless manner. A case where the wireless power transmission device 100 is a wireless charging apparatus will be described later with reference to FIG. 9.

Additionally, the wireless power transmission device 100 may be implemented with various forms of apparatuses transferring power to the wireless power reception device 200 requiring power in a contactless state.

The wireless power reception device 200 is a device that is operable by receiving power from the wireless power transmission device 100 in a wireless manner. Furthermore, the wireless power reception device 200 may charge a battery using the received wireless power.

On the other hand, an electronic device for receiving power in a wireless manner as described herein should be construed broadly to include a portable phone, a cellular phone, a smart phone, a personal digital assistant (PDA), a portable multimedia player (PMP), a tablet, a multimedia device, or the like, in addition to an input/output device such as a keyboard, a mouse, an audio-visual auxiliary device, and the like.

The wireless power reception device 200, as described later, may be a mobile communication terminal (for example, a portable phone, a cellular phone, and a tablet and the like) or a multimedia device.

On the other hand, the wireless power transmission device 100 may transfer power in a wireless manner without mutual contact to the wireless power reception device 200 using one or more wireless power transmission schemes. In other words, the wireless power transmission device 100 may transfer power using at least one of an inductive coupling scheme based on magnetic induction phenomenon by the wireless power signal and a magnetic resonance coupling scheme based on electromagnetic resonance phenomenon by a wireless power signal at a specific frequency.

Wireless power transmission in the inductive coupling scheme is a technology transferring power in a wireless manner using a primary coil and a secondary coil, and refers to the transmission of power by inducing a current from a coil to another coil through a changing magnetic field by a magnetic induction phenomenon.

Wireless power transmission in the resonance coupling scheme refers to a technology in which the wireless power reception device 200 generates resonance by a wireless power signal transmitted from the wireless power transmission device 100 to transfer power from the wireless power transmission device 100 to the wireless power reception device 200 by the resonance phenomenon.

Hereinafter, the wireless power transmission device 100 and wireless power reception device 200 according to the embodiments disclosed herein will be described in detail. In assigning reference numerals to the constituent elements in each of the following drawings, the same reference numerals will be used for the same constituent elements even though they are shown in a different drawing.

Figure 2A:
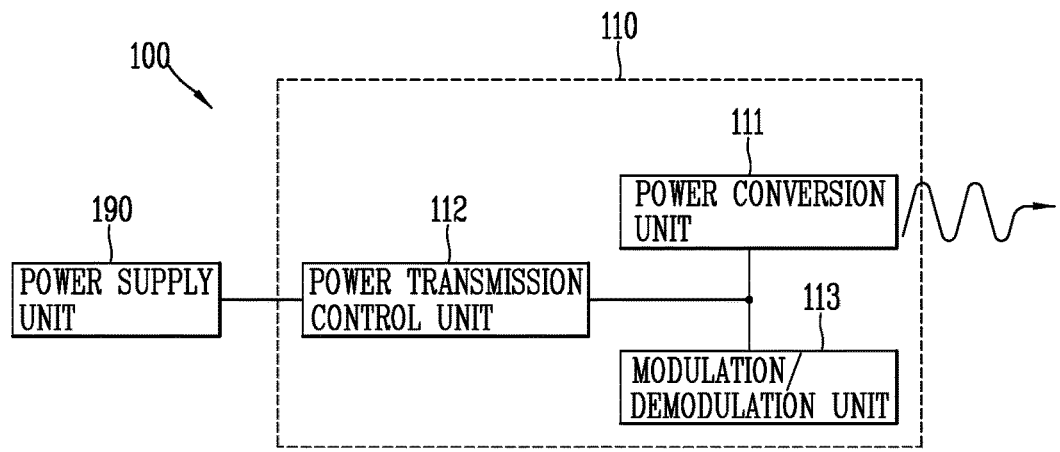
FIGS. 2A and 2B are exemplary block diagrams illustrating the configuration of a wireless power transmission device and an electronic device that can be employed in the embodiments disclosed herein, respectively.
Figure 2B:
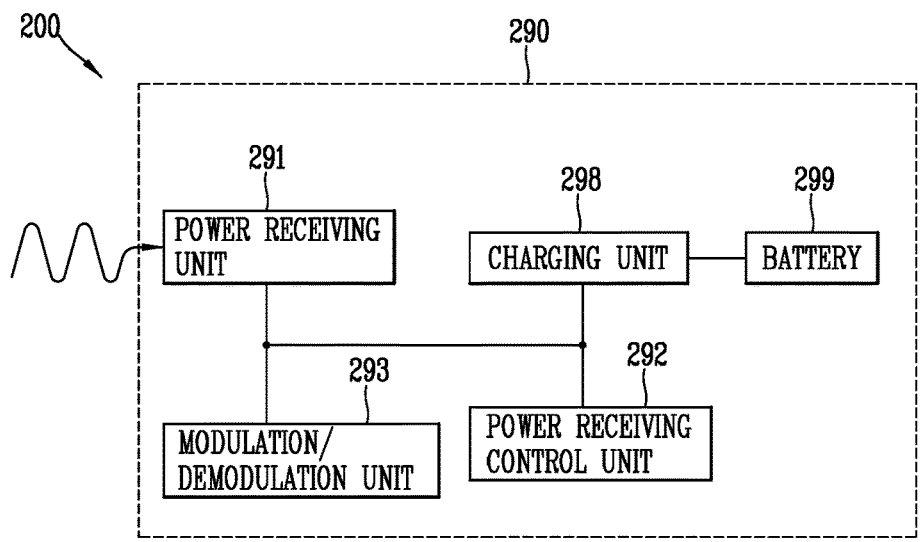

FIGS. 2A and 2B are exemplary block diagrams illustrating the configuration of a wireless power transmission device 100 and a wireless power reception device 200 that can be employed in the embodiments disclosed herein.

Wireless Power Transmission Device

Referring to FIG. 2A, the wireless power transmission device 100 may include a power transmission unit 110. The power transmission unit 110 may include a power conversion unit 111 and a power transmission control unit 112.

The power conversion unit 111 transfers power supplied from a transmission side power supply unit 190 to the wireless power reception device 200 by converting it into a wireless power signal. The wireless power signal transferred by the power conversion unit 111 is generated in the form of a magnetic field or electro-magnetic field having an oscillation characteristic. For this purpose, the power conversion unit 111 may be configured to include a coil for generating the wireless power signal.

The power conversion unit 111 may include a constituent element for generating a different type of wireless power signal according to each power transfer scheme. For example, the power conversion unit 111 may include a primary coil for forming a changing magnetic field to induce a current to a secondary coil of the wireless power reception device 200. Furthermore, the power conversion unit 111 may include a coil (or antenna) for forming a magnetic field having a specific resonant frequency to generate a resonant frequency in the wireless power reception device 200 according to the resonance coupling scheme.

Furthermore, the power conversion unit 111 may transfer power using at least one of the foregoing inductive coupling scheme and the resonance coupling scheme.

Among the constituent elements included in the power conversion unit 111, those for the inductive coupling scheme will be described later with reference to FIGS. 4 and 5, and those for the resonance coupling scheme will be described with reference to FIGS. 7 and 8.

On the other hand, the power conversion unit 111 may further include a circuit for controlling the characteristics of a frequency, an applied voltage, a current or the like, which are used to form the wireless power signal.

The power transmission control unit 112 controls each of the constituent elements included in the power transmission unit 110 The power transmission control unit 112 may be implemented to be integrated into another control unit (not shown) for controlling the wireless power transmission device 100.

On the other hand, a region where the wireless power signal can reach may be divided into two types. First, an active area denotes a region through which a wireless power signal transferring power to the wireless power reception device 200 is passed. Next, a semi-active area denotes an area of interest in which the wireless power transmission device 100 can sense the existence of the wireless power reception device 200. Here, the power transmission control unit 112 may sense whether the wireless power reception device 200 is placed in the active area or semi-active area or removed from the area. Specifically, the power transmission control unit 112 may detect whether or not the wireless power reception device 200 is placed in the active area or detection area using a wireless power signal formed from the power conversion unit 111 or a sensor separately provided therein. For instance, the power transmission control unit 112 may detect the presence of the wireless power reception device 200 by monitoring whether or not the characteristic of power for forming the wireless power signal is changed by the wireless power signal, which is affected by the wireless power reception device 200 existing in the detection area. However, the active area and detection area may vary according to the wireless power transmission scheme such as an inductive coupling scheme, a resonance coupling scheme, and the like.

The power transmission control unit 112 may perform the process of identifying the wireless power reception device 200 or determine whether to start wireless power transmission according to a result of detecting the existence of the wireless power reception device 200.

Furthermore, the power transmission control unit 112 may determine at least one characteristic of a frequency, a voltage, and a current of the power conversion unit 111 for forming the wireless power signal. The determination of the characteristic may be carried out by a condition at the side of the wireless power transmission device 100 or a condition at the side of the wireless power reception device 200.

The power transmission control unit 112 may receive a power control message from the wireless power reception device 200. The power transmission control unit 112 may determine at least one characteristic of a frequency, a voltage and a current of the power conversion unit 111 based on the received power control message, and additionally perform other control operations based on the power control message.

For example, the power transmission control unit 112 may determine at least one characteristic of a frequency, a voltage and a current used to form the wireless power signal according to the power control message including at least one of rectified power amount information, charging state information and identification information in the wireless power reception device 200.

Furthermore, as another control operation using the power control message, the wireless power transmission device 100 may perform a typical control operation associated with wireless power transmission based on the power control message. For example, the wireless power transmission device 100 may receive information associated with the wireless power reception device 200 to be auditorily or visually outputted through the power control message, or receive information required for authentication between devices.

In order to receive the power control message, the power transmission control unit 112 may use at least one of a method of receiving the power control message through the wireless power signal and a method of receiving the power control message through other user data.

In order to receive the foregoing power control message, the wireless power transmission device 100 may further include a modulation/demodulation unit 113 electrically connected to the power conversion unit 111. The modulation/demodulation unit 113 may modulate a wireless power signal that has been modulated by the wireless power reception device 200 and use it to receive the power control message.

In addition, the power transmission control unit 112 may acquire a power control message by receiving user data including a power control message by a communication means (not shown) included in the wireless power transmission device 100.

[In Case of Supporting in-Band Two-Way Communication]

Furthermore, under a wireless power transmission environment allowing for bi-directional communications according to the exemplary embodiments disclosed herein, the power transmission control unit 112 may transmit data to the wireless power reception device 200. The data transmitted by the power transmission control unit 112 may be transmitted to request the wireless power reception device 200 to send the power control message.

Wireless Power Reception Device

Referring to FIG. 2B, the wireless power reception device 200 may include a power supply unit 290. The power supply unit 290 supplies power required for the operation of the wireless power reception device 200. The power supply unit 290 may include a power reception unit 291 and a power reception control unit 292.

The power reception unit 291 receives power transferred from the wireless power transmission device 100 in a wireless manner.

The power reception unit 291 may include constituent elements required to receive the wireless power signal according to a wireless power transmission scheme. Furthermore, the power reception unit 291 may receive power according to at least one wireless power transmission scheme, and in this case, the power reception unit 291 may include constituent elements required for each method.

First, the power reception unit 291 may include a coil for receiving a wireless power signal transferred in the form of a magnetic field or electromagnetic field having a vibration characteristic.

For instance, as a constituent element according to the inductive coupling scheme, the power reception unit 291 may include a secondary coil to which a current is induced by a changing magnetic field. In exemplary embodiments, the power reception unit 291, as a constituent element according to the resonance coupling scheme, may include a coil and a resonant circuit in which resonance phenomenon is generated by a magnetic field having a specific resonant frequency.

However, when the power reception unit 291 receives power according to at least one wireless power transmission scheme, the power reception unit 291 may be implemented to receive power by using a coil, or implemented to receive power by using a coil formed differently according to each power transfer scheme.

Among the constituent elements included in the power reception unit 291, those for the inductive coupling scheme will be described later with reference to FIG. 4, and those for the resonance coupling scheme with reference to FIG. 7.

On the other hand, the power reception unit 291 may further include a rectifier and a regulator to convert the wireless power signal into a direct current. Furthermore, the power reception unit 291 may further include a circuit for protecting an overvoltage or overcurrent from being generated by the received power signal.

The power reception control unit 292 may control each constituent element included in the power supply unit 290.

Specifically, the power reception control unit 292 may transfer a power control message to the wireless power transmission device 100. The power control message may instruct the wireless power transmission device 100 to initiate or terminate a transfer of the wireless power signal. Furthermore, the power control message may instruct the wireless power transmission device 100 to control a characteristic of the wireless power signal.

In order to transmit the power control message, the power reception control unit 292 may use at least one of a method of transmitting the power control message through the wireless power signal and a method of transmitting the power control message through other user data.

In order to transmit the power control message, the wireless power reception device 200 may further include a modulation/demodulation unit 293 electrically connected to the power reception unit 291. The modulation/demodulation unit 293, similarly to the case of the wireless power transmission device 100, may be used to transmit the power control message through the wireless power signal. The modulation/demodulation unit 293 may be used as a means for controlling a current and/or voltage flowing through the power conversion unit 111 of the wireless power transmission device 100. Hereinafter, a method for allowing the power communications modulation/demodulation unit 113 or 293 at the side of the wireless power transmission device 100 and at the side of the wireless power reception device 200, respectively, to be used to transmit and receive a power control message through a wireless power signal will be described.

A wireless power signal formed by the power conversion unit 111 is received by the power reception unit 291. At this time, the power reception control unit 292 controls the modulation/demodulation unit 293 at the side of the wireless power reception device 200 to modulate the wireless power signal. For instance, the power reception control unit 292 may perform a modulation process such that a power amount received from the wireless power signal is varied by changing a reactance of the modulation/demodulation unit 293 connected to the power reception unit 291. The change of a power amount received from the wireless power signal results in the change of a current and/or voltage of the power conversion unit 111 for forming the wireless power signal. At this time, the modulation/demodulation unit 113 at the side of the wireless power transmission device 100 may detect a change of the current and/or voltage to perform a demodulation process.

In other words, the power reception control unit 292 may generate a packet including a power control message intended to be transferred to the wireless power transmission device 100 and modulate the wireless power signal to allow the packet to be included therein, and the power transmission control unit 112 may decode the packet based on a result of performing the demodulation process of the power communications modulation/demodulation unit 113 to acquire the power control message included in the packet.

In addition, the power reception control unit 292 may transmit a power control message to the wireless power transmission device 100 by transmitting user data including the power control message by a communication means (not shown) included in the wireless power reception device 200.

[In Case of Supporting in-Band Two-Way Communication]

Furthermore, under a wireless power transmission environment allowing for bi-directional communications according to the exemplary embodiments disclosed herein, the power reception control unit 292 may receive data to the wireless power transmission device 100. The data transmitted by the wireless power transmission device 100 may be transmitted to request the wireless power reception device 200 to send the power control message.

In addition, the power supply unit 290 may further include a charger 298 and a battery 299.

The wireless power reception device 200 receiving power for operation from the power supply unit 290 may be operated by power transferred from the wireless power transmission device 100, or operated by charging the battery 299 using the transferred power and then receiving the charged power. At this time, the power reception control unit 292 may control the charger 298 to perform charging using the transferred power.

Hereinafter, description will be given of a wireless power transmission device and a wireless power reception device applicable to the exemplary embodiments disclosed herein. First, a method of allowing the wireless power transmission device to transfer power to the electronic device according to the inductive coupling scheme will be described with reference to FIGS. 3 through 5.

Inductive Coupling Scheme

Figure 3:
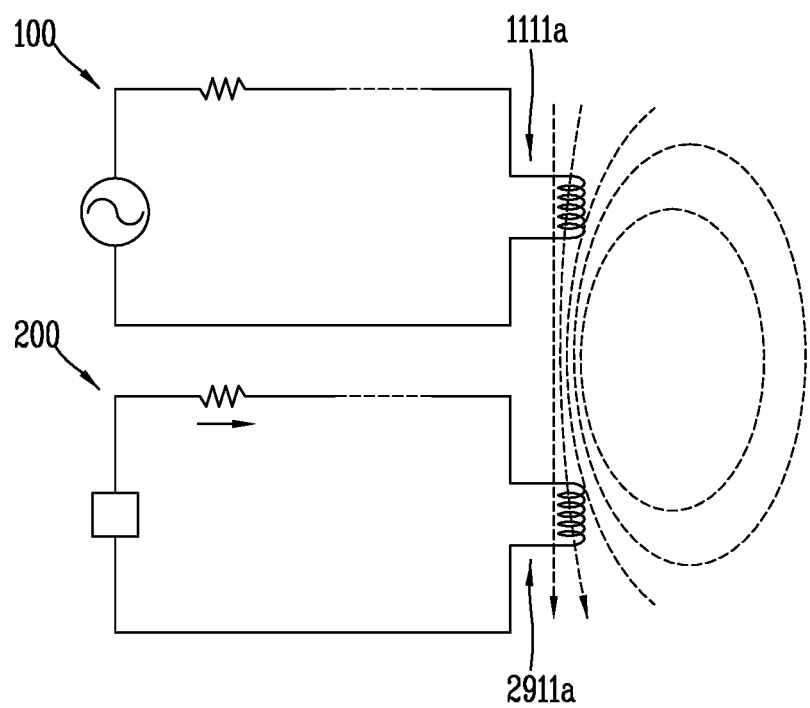
FIG. 3 is a view illustrating a concept in which power is transferred from a wireless power transmission device to an electronic device in a wireless manner according to an inductive coupling scheme.

FIG. 3 is a view illustrating a concept in which power is transferred from a wireless power transmission device to an electronic device in a wireless manner according to an inductive coupling scheme.

When the power of the wireless power transmission device 100 is transferred in an inductive coupling scheme, if the strength of a current flowing through a primary coil within the power transmission unit 110 is changed, then a magnetic field passing through the primary coil will be changed by the current. The changed magnetic field generates an induced electromotive force at a secondary coil in the wireless power reception device 200.

According to the foregoing method, the power conversion unit 111 of the wireless power transmission device 100 may include a transmitting (Tx) coil 1111*a* being operated as a primary coil in magnetic induction. Furthermore, the power reception unit 291 of the wireless power reception device 200 may include a receiving (Rx) coil 2911*a* being operated as a secondary coil in magnetic induction.

First, the wireless power transmission device 100 and wireless power reception device 200 are disposed in such a manner that the transmission coil 1111*a* at the side of the wireless power transmission device 100 and the reception coil at the side of the wireless power reception device 200 are located adjacent to each other. Then, if the power transmission control unit 112 controls a current of the transmission coil (Tx coil) 1111*a* to be changed, then the power reception unit 291 controls power to be supplied to the wireless power reception device 200 using an electromotive force induced to the reception coil (Rx coil) 2911*a*.

The efficiency of wireless power transmission by the inductive coupling scheme may be little affected by a frequency characteristic, but affected by an alignment and distance between the wireless power transmission device 100 and the wireless power reception device 200 including each coil.

On the other hand, in order to perform wireless power transmission in the inductive coupling scheme, the wireless power transmission device 100 may be configured to include an interface surface (not shown) in the form of a flat surface. One or more electronic devices may be placed at an upper portion of the interface surface, and the transmission coil 1111*a* may be mounted at a lower portion of the interface surface. In this case, a vertical spacing is formed in a small-scale between the transmission coil 1111*a* mounted at a lower portion of the interface surface and the reception coil 2911*a* of the wireless power reception device 200 placed at an upper portion of the interface surface, and thus a distance between the coils becomes sufficiently small to efficiently implement contactless power transfer by the inductive coupling scheme.

Furthermore, an alignment indicator (not shown) indicating a location where the wireless power reception device 200 is to be placed at an upper portion of the interface surface. The alignment indicator indicates a location of the wireless power reception device 200 where an alignment between the transmission coil 1111*a* mounted at a lower portion of the interface surface and the reception coil 2911*a* can be suitably implemented. The alignment indicator may alternatively be simple marks, or may be formed in the form of a protrusion structure for guiding the location of the wireless power reception device 200. Otherwise, the alignment indicator may be formed in the form of a magnetic body such as a magnet mounted at a lower portion of the interface surface, thereby guiding the coils to be suitably arranged by mutual magnetism to a magnetic body having an opposite polarity mounted within the wireless power reception device 200.

On the other hand, the wireless power transmission device 100 may be formed to include one or more transmission coils. The wireless power transmission device 100 may selectively use some of coils suitably arranged with the reception coil 2911*a* of the wireless power reception device 200 among the one or more transmission coils to enhance the power transmission efficiency. The wireless power transmission device 100 including the one or more transmission coils will be described later with reference to FIG. 5.

Hereinafter, configurations of the wireless power transmission device and electronic device using an inductive coupling scheme applicable to the embodiments disclosed herein will be described in detail.

Figure 4A:
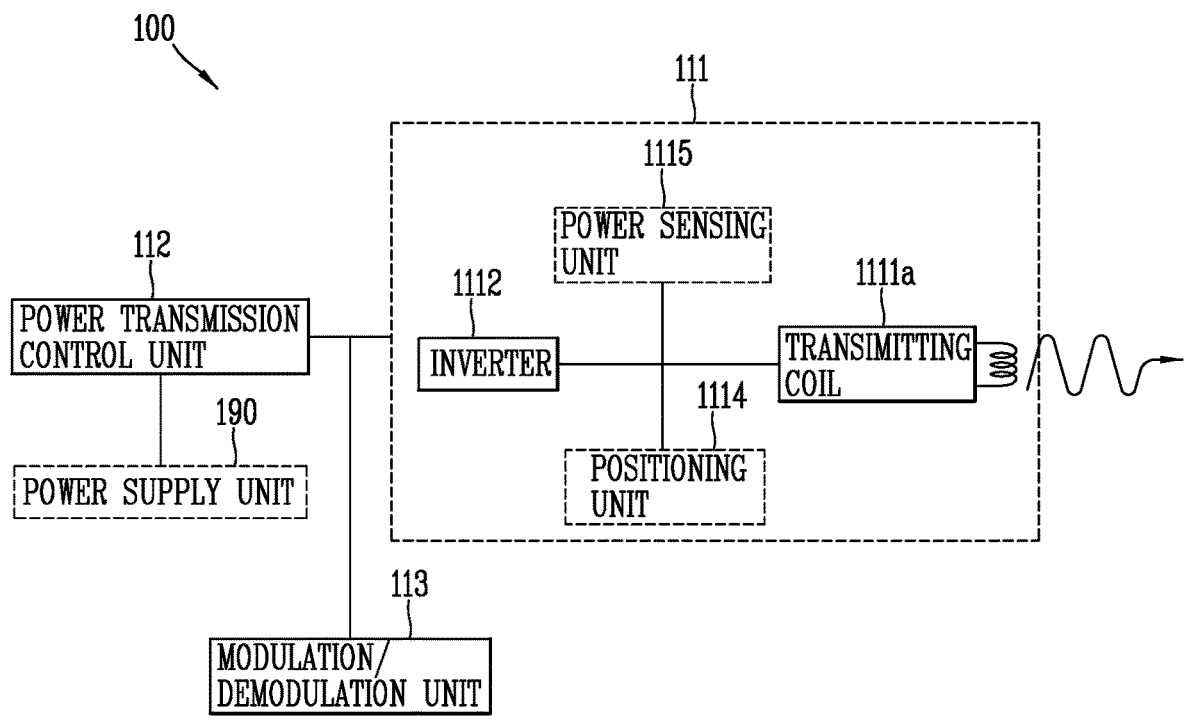
FIGS. 4A and 4B are block diagrams illustrating part of a wireless power transmission device and an electronic device in a magnetic induction method that can be employed in the embodiments disclosed herein.
Figure 4B:
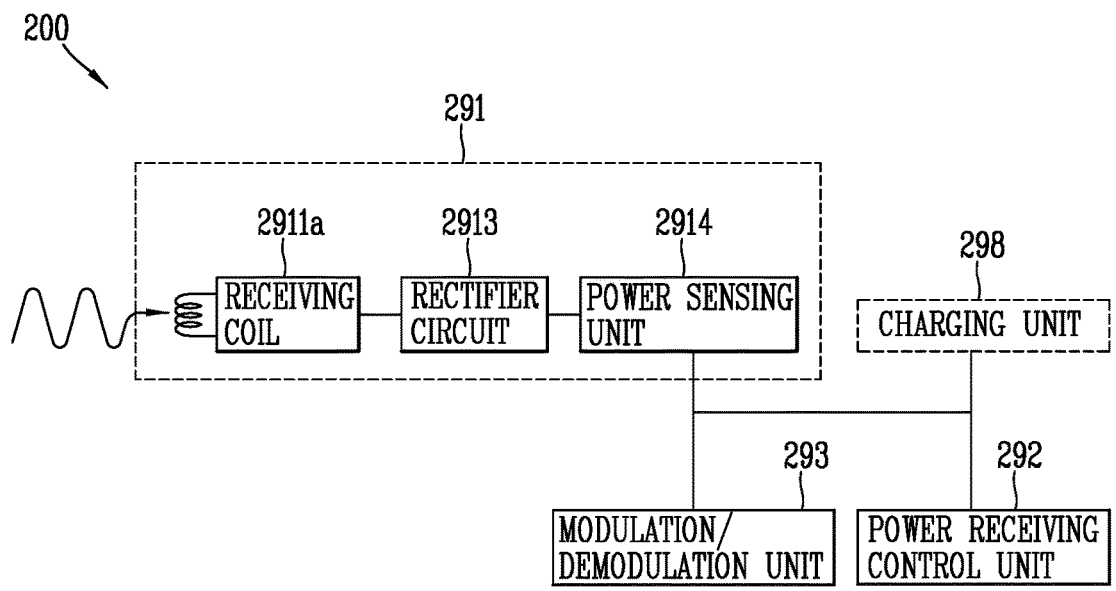

Wireless Power Transmission Device and Wireless Power Reception Device in Inductive Coupling Scheme FIG. 4 is a block diagram illustrating part of the wireless power transmission device 100 and wireless power reception device 200 in a magnetic induction method that can be employed in the embodiments disclosed herein. A configuration of the power transmission unit 110 included in the wireless power transmission device 100 will be described with reference to FIG. 4A, and a configuration of the power supply unit 290 included in the wireless power reception device 200 will be described with reference to FIG. 4B.

Referring to FIG. 4A, the power conversion unit 111 of the wireless power transmission device 100 may include a transmitting (Tx) coil 1111*a* and an inverter 1112.

The transmission coil 1111*a* may form a magnetic field corresponding to the wireless power signal according to a change of current as described above. The transmission coil 1111*a* may alternatively be implemented with a planar spiral type or cylindrical solenoid type.

The inverter 1112 transforms a DC input obtained from the power supply unit 190 into an AC waveform. The AC current transformed by the inverter 1112 drives a resonant circuit including the transmission coil 1111*a* and a capacitor (not shown) to form a magnetic field in the transmission coil 1111*a*.

In addition, the power conversion unit 111 may further include a positioning unit 1114.

The positioning unit 1114 may move or rotate the transmission coil 1111*a* to enhance the effectiveness of contactless power transfer using the inductive coupling scheme. As described above, it is because an alignment and distance between the wireless power transmission device 100 and the wireless power reception device 200 including a primary coil and a secondary coil may affect power transfer using the inductive coupling scheme. In particular, the positioning unit 1114 may be used when the wireless power reception device 200 does not exist within an active area of the wireless power transmission device 100.

Accordingly, the positioning unit 1114 may include a drive unit (not shown) for moving the transmission coil 1111*a* such that a center-to-center distance of the transmission coil 1111*a* of the wireless power transmission device 100 and the reception coil 2911*a* of the wireless power reception device 200 is within a predetermined range, or rotating the transmission coil 1111*a* such that the centers of the transmission coil 1111*a* and the reception coil 2911*a* are overlapped with each other.

For this purpose, the wireless power transmission device 100 may further include a detection unit (not shown) made of a sensor for detecting the location of the wireless power reception device 200, and the power transmission control unit 112 may control the positioning unit 1114 based on the location information of the wireless power reception device 200 received from the location detection sensor.

Furthermore, to this end, the power transmission control unit 112 may receive control information on an alignment or distance to the wireless power reception device 200 through the power communications modulation/demodulation unit 113, and control the positioning unit 1114 based on the received control information on the alignment or distance.

If the power conversion unit 111 is configured to include a plurality of transmission coils, then the positioning unit 1114 may determine which one of the plurality of transmission coils is to be used for power transmission. The configuration of the wireless power transmission device 100 including the plurality of transmission coils will be described later with reference to FIG. 5.

On the other hand, the power conversion unit 111 may further include a power sensing unit 1115. The power sensing unit 1115 at the side of the wireless power transmission device 100 monitors a current or voltage flowing into the transmission coil 1111*a*. The power sensing unit 1115 is provided to check whether or not the wireless power transmission device 100 is normally operated, and thus the power sensing unit 1115 may detect a voltage or current of the power supplied from the outside, and check whether the detected voltage or current exceeds a threshold value. The power sensing unit 1115, although not shown, may include a resistor for detecting a voltage or current of the power supplied from the outside and a comparator for comparing a voltage value or current value of the detected power with a threshold value to output the comparison result. Based on the check result of the power sensing unit 1115, the power transmission control unit 112 may control a switching unit (not shown) to cut off power applied to the transmission coil 1111*a*.

Referring to FIG. 4B, the power supply unit 290 of the wireless power reception device 200 may include a receiving (Rx) coil 2911*a* and a rectifier 2913.

A current is induced into the reception coil 2911*a* by a change of the magnetic field formed in the transmission coil 1111*a*. The implementation type of the reception coil 2911*a* may be a planar spiral type or cylindrical solenoid type similarly to the transmission coil 1111*a*.

Furthermore, series and parallel capacitors may be configured to be connected to the reception coil 2911*a* to enhance the effectiveness of wireless power reception or perform resonant detection.

The reception coil 2911*a* may be in the form of a single coil or a plurality of coils.

The rectifier 2913 performs a full-wave rectification to a current to convert alternating current into direct current. The rectifier 2913, for instance, may be implemented with a full-bridge rectifier made of four diodes or a circuit using active components.

In addition, the rectifier 2913 may further include a regulator for converting a rectified current into a more flat and stable direct current. Furthermore, the output power of the rectifier 2913 is supplied to each constituent element of the power supply unit 290. Furthermore, the rectifier 2913 may further include a DC-DC converter for converting output DC power into a suitable voltage to adjust it to the power required for each constituent element (for instance, a circuit such as a charger 298).

The modulation/demodulation unit 293 may be connected to the power reception unit 291, and may be configured with a resistive element in which resistance varies with respect to direct current, and may be configured with a capacitive element in which reactance varies with respect to alternating current. The power reception control unit 292 may change the resistance or reactance of the modulation/demodulation unit 293 to modulate a wireless power signal received to the power reception unit 291.

On the other hand, the power supply unit 290 may further include a power sensing unit 2914. The power sensing unit 2914 at the side of the wireless power reception device 200 monitors a voltage and/or current of the power rectified by the rectifier 2913, and if the voltage and/or current of the rectified power exceeds a threshold value as a result of monitoring, then the power reception control unit 292 transmits a power control message to the wireless power transmission device 100 to transfer suitable power.

Figure 5:
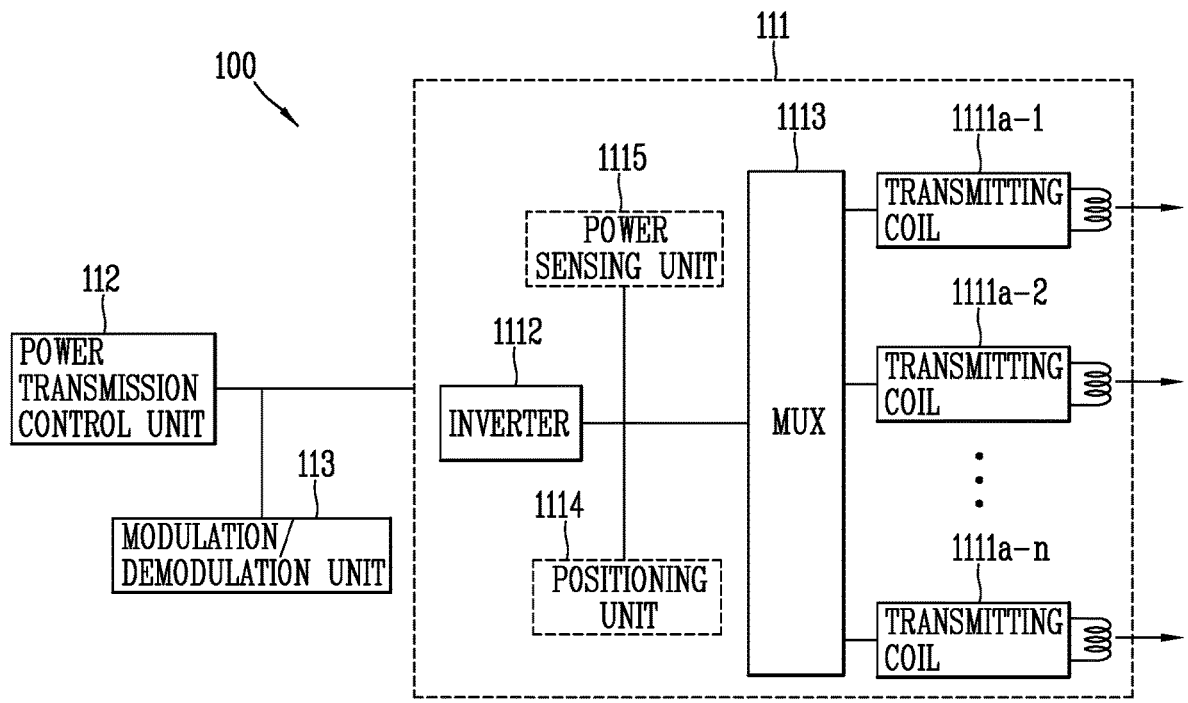
FIG. 5 is a block diagram illustrating a wireless power transmission device configured to have one or more transmission coils receiving power according to an inductive coupling scheme that can be employed in the embodiments disclosed herein.

Wireless Power Transmission Device Configured to Include One or More Transmission Coils FIG. 5 is a block diagram illustrating a wireless power transmission device configured to have one or more transmission coils receiving power according to an inductive coupling scheme that can be employed in the embodiments disclosed herein.

Referring to FIG. 5, the power conversion unit 111 of the wireless power transmission device 100 according to the embodiments disclosed herein may include one or more transmission coils 1111a-1 to 1111a-n. The one or more transmission coils 1111a-1 to 1111a-n may be an array of partly overlapping primary coils. An active area may be determined by some of the one or more transmission coils.

The one or more transmission coils 1111a-1 to 1111a-n may be mounted at a lower portion of the interface surface. Furthermore, the power conversion unit 111 may further include a multiplexer 1113 for establishing and releasing the connection of some of the one or more transmission coils 1111a-1 to 1111a-n.

Upon detecting the location of the wireless power reception device 200 placed at an upper portion of the interface surface, the power transmission control unit 112 may take the detected location of the wireless power reception device 200 into consideration to control the multiplexer 1113, thereby allowing coils that can be placed in an inductive coupling relation to the reception coil 2911a of the wireless power reception device 200 among the one or more transmission coils 1111a-1 to 1111a-n to be connected to one another.

For this purpose, the power transmission control unit 112 may acquire the location information of the wireless power reception device 200. For example, the power transmission control unit 112 may acquire the location of the wireless power reception device 200 on the interface surface by the location detection unit (not shown) provided in the wireless power transmission device 100. For another example, the power transmission control unit 112 may alternatively receive a power control message indicating a strength of the wireless power signal from an object on the interface surface or a power control message indicating the identification information of the object using the one or more transmission coils 1111a-1 to 1111a-n, respectively, and determines whether it is located adjacent to which one of the one or more transmission coils based on the received result, thereby acquiring the location information of the wireless power reception device 200.

On the other hand, the active area as part of the interface surface may denote a portion through which a magnetic field with a high efficiency can pass when the wireless power transmission device 100 transfers power to the wireless power reception device 200 in a wireless manner. At this time, a single transmission coil or one or a combination of more transmission coils forming a magnetic field passing through the active area may be designated as a primary cell. Accordingly, the power transmission control unit 112 may determine an active area based on the detected location of the wireless power reception device 200, and establish the connection of a primary cell corresponding to the active area to control the multiplexer 1113, thereby allowing the reception coil 2911a of the wireless power reception device 200 and the coils belonging to the primary cell to be placed in an inductive coupling relation.

Furthermore, the power conversion unit 111 may further include an impedance matching unit (not shown) for controlling an impedance to form a resonant circuit with the coils connected thereto.

Hereinafter, a method for allowing a wireless power transmission device to transfer power according to a resonance coupling scheme will be disclosed with reference to FIGS. 6 through 8.

Resonance Coupling Scheme

Figure 6:
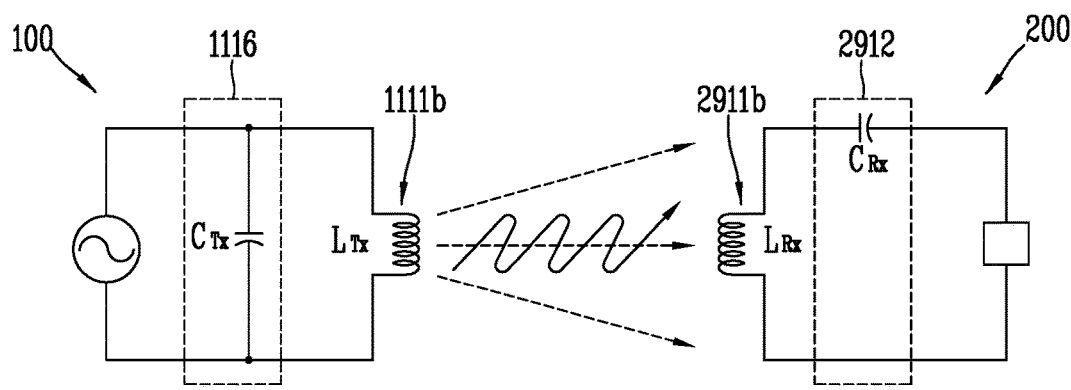
FIG. 6 is a view illustrating a concept in which power is transferred to an electronic device from a wireless power transmission device in a wireless manner according to a resonance coupling scheme.

FIG. 6 is a view illustrating a concept in which power is transferred to an electronic device from a wireless power transmission device in a wireless manner according to a resonance coupling scheme.

First, resonance will be described in brief as follows. Resonance refers to a phenomenon in which amplitude of vibration is remarkably increased when periodically receiving an external force having the same frequency as the natural frequency of a vibration system. Resonance is a phenomenon occurring at all kinds of vibrations such as mechanical vibration, electric vibration, and the like. Generally, when exerting a vibratory force to a vibration system from the outside, if the natural frequency thereof is the same as a frequency of the externally applied force, then the vibration becomes strong, thus increasing the width.

With the same principle, when a plurality of vibrating bodies separated from one another within a predetermined distance vibrate at the same frequency, the plurality of vibrating bodies resonate with one another, and in this case, resulting in a reduced resistance between the plurality of vibrating bodies. In an electrical circuit, a resonant circuit can be made by using an inductor and a capacitor.

When the wireless power transmission device 100 transfers power according to the inductive coupling scheme, a magnetic field having a specific vibration frequency is formed by alternating current power in the power transmission unit 110. If a resonance phenomenon occurs in the wireless power reception device 200 by the formed magnetic field, then power is generated by the resonance phenomenon in the wireless power reception device 200.

The resonant frequency may be determined by the following formula in Equation 1.

$$f = \frac{1}{2\pi\sqrt{LC}} \quad \text{[Equation 1]}$$

Here, the resonant frequency (f) is determined by an inductance (L) and a capacitance (C) in a circuit. In a circuit forming a magnetic field using a coil, the inductance can be determined by a number of turns of the coil, and the like, and the capacitance can be determined by a gap between the coils, an area, and the like. In addition to the coil, a capacitive resonant circuit may be configured to be connected thereto to determine the resonant frequency.

Referring to FIG. 6, when power is transmitted in a wireless manner according to the resonance coupling scheme, the power conversion unit 111 of the wireless power transmission device 100 may include a transmitting (Tx) coil 1111b in which a magnetic field is formed and a resonant circuit 1116 connected to the transmission coil 1111b to determine a specific vibration frequency. The resonant circuit 1116 may be implemented by using a capacitive circuit (capacitors), and the specific vibration frequency may be determined based on an inductance of the transmission coil 1111b and a capacitance of the resonant circuit 1116.

The configuration of a circuit element of the resonant circuit 1116 may be implemented in various forms such that the power conversion unit 111 forms a magnetic field, and is not limited to a form of being connected in parallel to the transmission coil 1111b as illustrated in FIG. 6.

Furthermore, the power reception unit 291 of the wireless power reception device 200 may include a resonant circuit 2912 and a receiving (Rx) coil 2911b to generate a resonance phenomenon by a magnetic field formed in the wireless power transmission device 100. In other words, the resonant circuit 2912 may be also implemented by using a capacitive circuit, and the resonant circuit 2912 is configured such that a resonant frequency determined based on an inductance of the reception coil 2911b and a capacitance of the resonant circuit 2912 has the same frequency as a resonant frequency of the formed magnetic field.

The configuration of a circuit element of the resonant circuit 2912 may be implemented in various forms such that the power reception unit 291 generates resonance by a magnetic field, and is not limited to a form of being connected in series to the reception coil 2911b as illustrated in FIG. 6.

The specific vibration frequency in the wireless power transmission device 100 may have LTX, CTX, and may be acquired by using the Equation 1. Here, the wireless power reception device 200 generates resonance when a result of substituting the LRX and CRX of the wireless power reception device 200 to the Equation 1 is same as the specific vibration frequency.

According to a contactless power transfer scheme by resonance coupling, when the wireless power transmission device 100 and wireless power reception device 200 resonate at the same frequency, respectively, an electromagnetic wave is propagated through a short-range magnetic field, and thus there exists no energy transfer between the devices if they have different frequencies.

As a result, an efficiency of contactless power transfer by the resonance coupling scheme is greatly affected by a frequency characteristic, whereas the effect of an alignment and distance between the wireless power transmission device 100 and the wireless power reception device 200 including each coil is relatively smaller than the inductive coupling scheme.

Hereinafter, the configuration of a wireless power transmission device and an electronic device in the resonance coupling scheme applicable to the embodiments disclosed herein will be described in detail.

Wireless Power Transmission Device in Resonance Coupling Scheme

FIG. 7 is a block diagram illustrating part of the wireless power transmission device 100 and wireless power reception device 200 in a resonance method that can be employed in the embodiments disclosed herein.

Figure 7A:
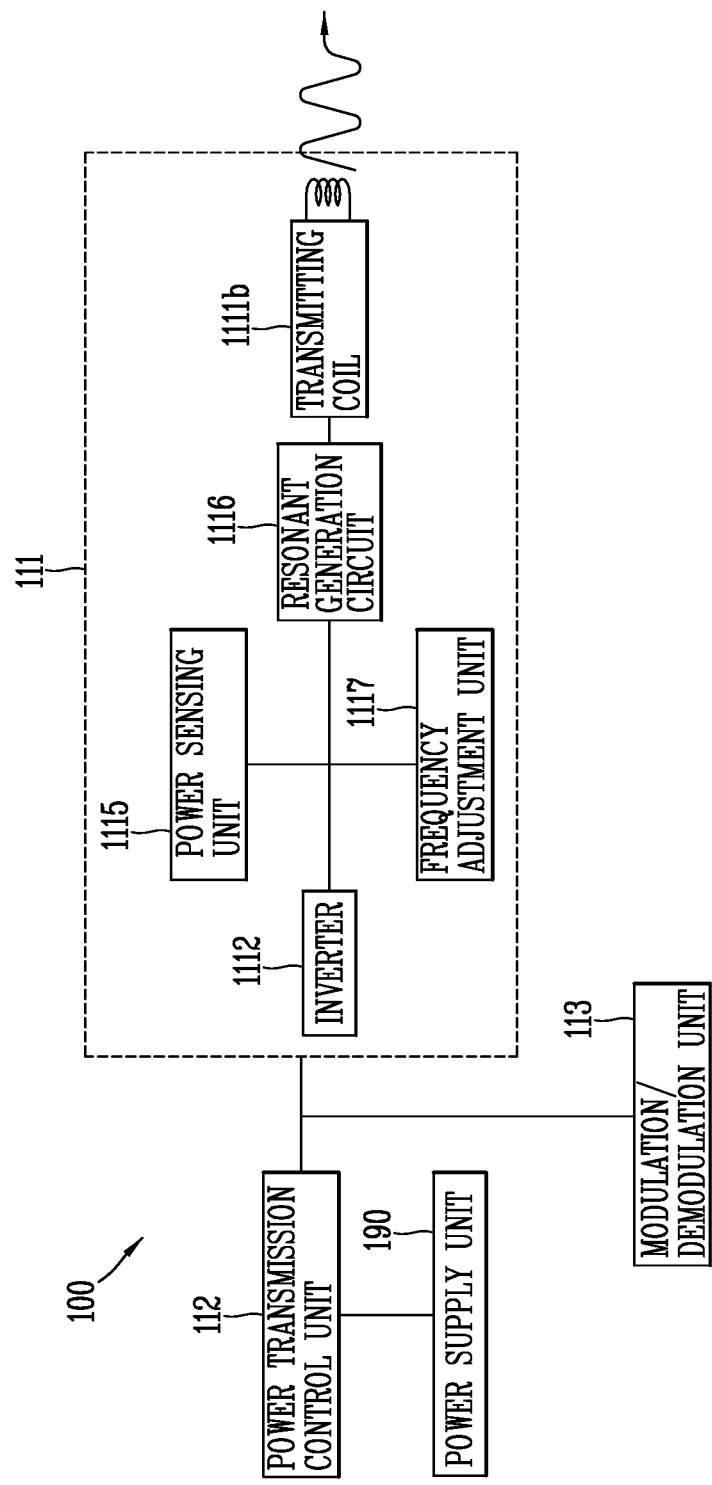
FIGS. 7A and 7B are block diagrams exemplarily illustrating part of a wireless power transmission device and an electronic device in a resonance method that can be employed in the embodiments disclosed herein.

A configuration of the power transmission unit 110 included in the wireless power transmission device 100 will be described with reference to FIG. 7A.

The power conversion unit 111 of the wireless power transmission device 100 may include a transmitting (Tx) coil 1111b, an inverter 1112, and a resonant circuit 1116. The inverter 1112 may be configured to be connected to the transmission coil 1111b and the resonant circuit 1116.

The transmission coil 1111b may be mounted separately from the transmission coil 1111a for transferring power according to the inductive coupling scheme, but may transfer power in the inductive coupling scheme and resonance coupling scheme using one single coil.

The transmission coil 1111b, as described above, forms a magnetic field for transferring power. The transmission coil 1111b and the resonant circuit 1116 generate resonance when alternating current power is applied thereto, and at this time, a vibration frequency may be determined based on an inductance of the transmission coil 1111b and a capacitance of the resonant circuit 1116.

For this purpose, the inverter 1112 transforms a DC input obtained from the power supply unit 190 into an AC waveform, and the transformed AC current is applied to the transmission coil 1111b and the resonant circuit 1116.

In addition, the power conversion unit 111 may further include a frequency adjustment unit 1117 for changing a resonant frequency of the power conversion unit 111. The resonant frequency of the power conversion unit 111 is determined based on an inductance and/or capacitance within a circuit constituting the power conversion unit 111 by Equation 1, and thus the power transmission control unit 112 may determine the resonant frequency of the power conversion unit 111 by controlling the frequency adjustment unit 1117 to change the inductance and/or capacitance.

The frequency adjustment unit 1117, for example, may be configured to include a motor for adjusting a distance between capacitors included in the resonant circuit 1116 to change a capacitance, or include a motor for adjusting a number of turns or diameter of the transmission coil 1111b to change an inductance, or include active elements for determining the capacitance and/or inductance On the other hand, the power conversion unit 111 may further include a power sensing unit 1115. The operation of the power sensing unit 1115 is the same as the foregoing description.

Figure 7B:
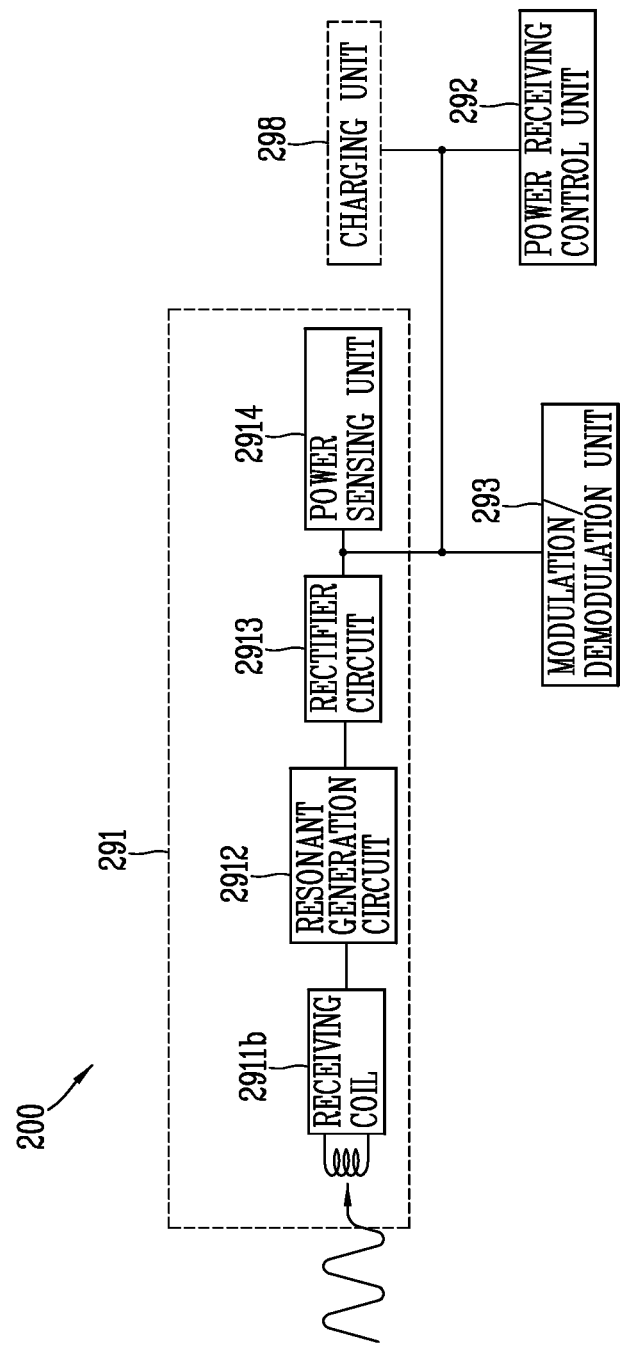

Referring to FIG. 7B, a configuration of the power supply unit 290 included in the wireless power reception device 200 will be described. The power supply unit 290, as described above, may include the receiving (Rx) coil 2911b and resonant circuit 2912.

In addition, the power reception unit 291 of the power supply unit 290 may further include a rectifier 2913 for converting an AC current generated by resonance phenomenon into DC. The rectifier 2913 may be configured similarly to the foregoing description.

Furthermore, the power reception unit 291 may further include a power sensing unit 2914 for monitoring a voltage and/or current of the rectified power. The power sensing unit 2914 may be configured similarly to the foregoing description.

Figure 8:
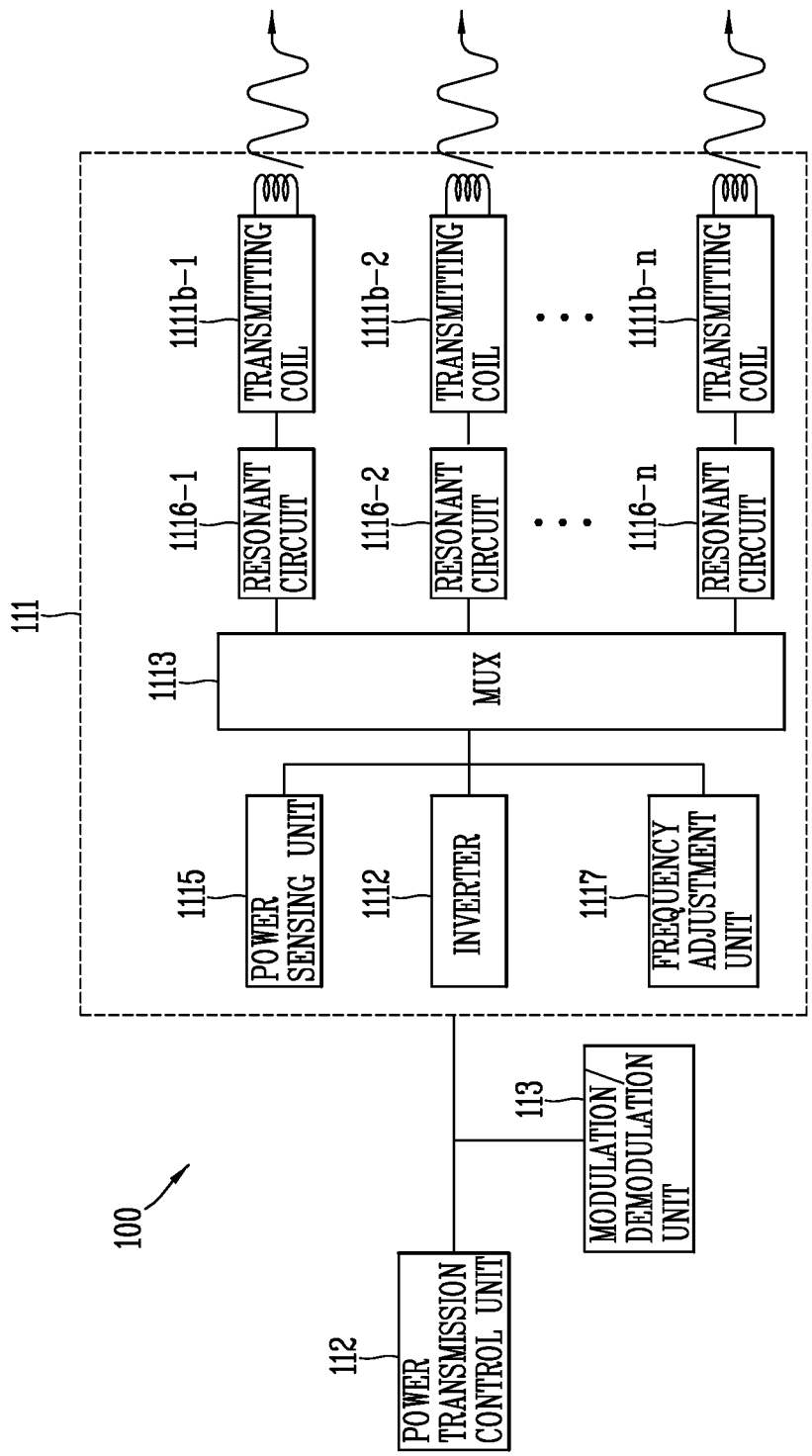
FIG. 8 is a block diagram illustrating a wireless power transmission device configured to have one or more transmission coils receiving power according to a resonance coupling scheme that can be employed in the embodiments disclosed herein.

Wireless Power Transmission Device Configured to Include One or More Transmission Coils FIG. 8 is a block diagram illustrating a wireless power transmission device configured to have one or more transmission coils receiving power according to a resonance coupling scheme that can be employed in the embodiments disclosed herein.

Referring to FIG. 8, the power conversion unit 111 of the wireless power transmission device 100 according to the embodiments disclosed herein may include one or more transmission coils 1111b-1 to 1111b-n and resonant circuits 1116-1 to 1116-n connected to each transmission coils. Furthermore, the power conversion unit 111 may further include a multiplexer 1113 for establishing and releasing the connection of some of the one or more transmission coils 1111b-1 to 1111b-n.

The one or more transmission coils 1111b-1 to 1111b-n may be configured to have the same vibration frequency, or some of them may be configured to have different vibration frequencies. It is determined by an inductance and/or capacitance of the resonant circuits 1116-1 to 1116-n connected to the one or more transmission coils 1111b-1 to 1111b-n, respectively.

For this purpose, the frequency adjustment unit 1117 may be configured to change an inductance and/or capacitance of the resonant circuits 1116-1 to 1116-n connected to the one or more transmission coils 1111b-1 to 1111b-n, respectively.

In-Band Communication

Figure 9:
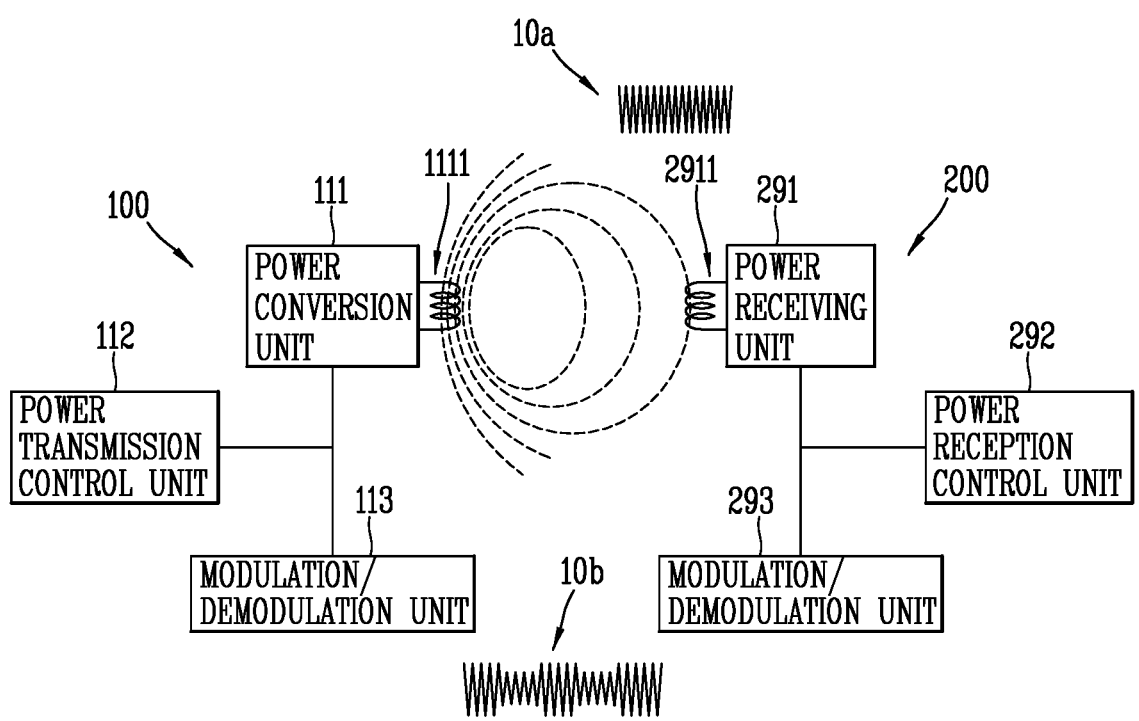
FIG. 9 is a block diagram illustrating a wireless power transmission device further including an additional element in addition to the configuration illustrated in FIG. 2A.

FIG. 9 a view illustrating the concept of transmitting and receiving a packet between a wireless power transmission device and a wireless power reception device through the modulation and demodulation of a wireless power signal in transferring power in a wireless manner disclosed herein.

Referring to FIG. 9, the power conversion unit 111 included in the wireless power transmission device 100 may generate a wireless power signal. The wireless power signal may be generated through the transmission coil 1111 included in the power conversion unit 111.

The wireless power signal 10a generated by the power conversion unit 111 may arrive at the wireless power reception device 200 so as to be received through the power reception unit 291 of the wireless power reception device 200. The generated wireless power signal may be received through the reception coil 2911 included in the power reception unit 291.

The power reception control unit 292 may control the modulation/demodulation unit 293 connected to the power reception unit 291 to modulate the wireless power signal while the wireless power reception device 200 receives the wireless power signal. When the received wireless power signal is modulated, the wireless power signal may form a closed-loop within a magnetic field or an electro-magnetic field. This may allow the wireless power transmission device 100 to sense a modulated wireless power signal 10b. The modulation/demodulation unit 113 may demodulate the sensed wireless power signal and decode the packet from the demodulated wireless power signal.

On the other hand, a modulation method employed for the communication between the wireless power transmission device 100 and the wireless power reception device 200 may be an amplitude modulation. As aforementioned, the amplitude modulation is a backscatter modulation may be a backscatter modulation method in which the modulation/demodulation unit 293 at the side of the wireless power reception device 200 changes an amplitude of the wireless power signal 10a formed by the power conversion unit 111 and the power reception control unit 292 at the side of the wireless power transmission device 100 detects an amplitude of the modulated wireless power signal 10b.

Modulation and Demodulation of Wireless Power Signal

Hereinafter, description will be given of modulation and demodulation of a packet, which is transmitted or received between the wireless power transmission device 100 and the wireless power reception device 200 with reference to FIGS. 10 and 11.

Figure 10:
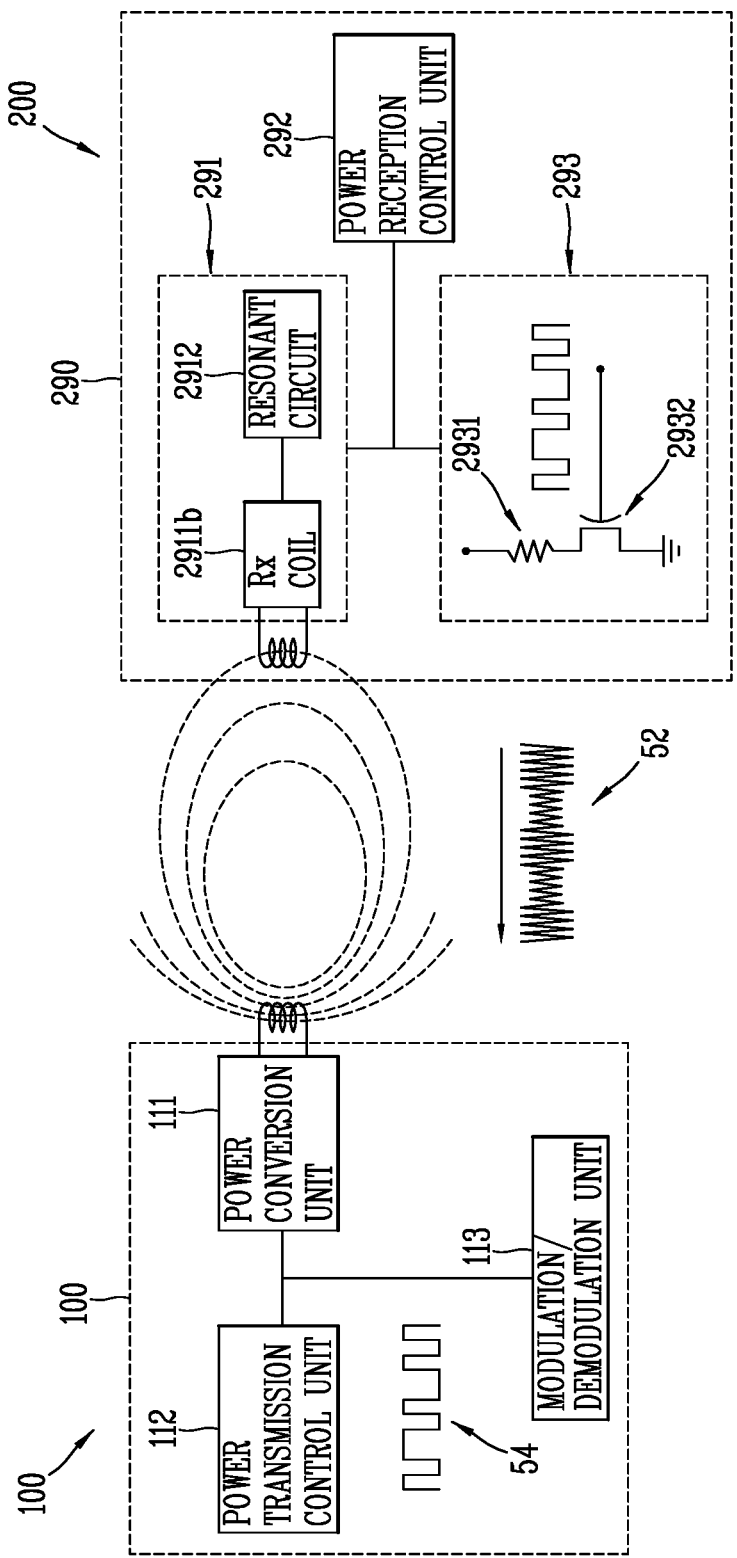
FIG. 10 is view illustrating a configuration in case where an electronic device according to the embodiments disclosed herein is implemented in the form of a mobile terminal.
Figure 11:
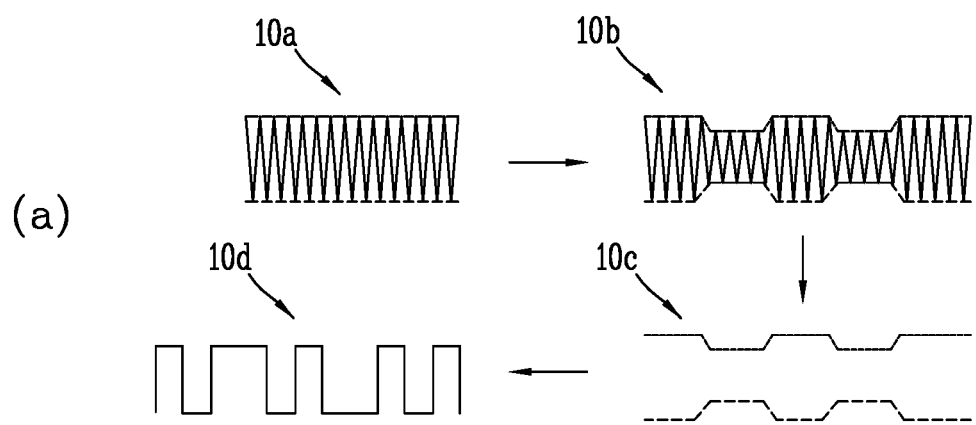
FIG. 11 is a view illustrating the concept of transmitting and receiving a packet between a wireless power transmission device and an electronic device through the modulation and demodulation of a wireless power signal in wireless power transmission disclosed herein.
Figure 11:
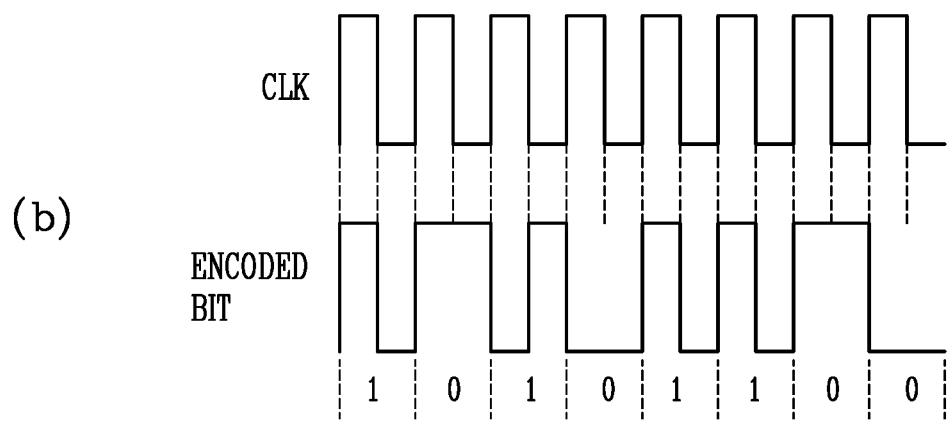
Figure 11:
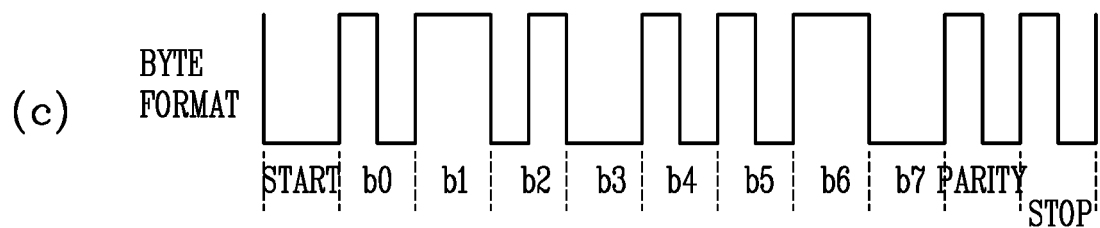

FIG. 10 is a view illustrating a configuration of transmitting or receiving a power control message in transferring power in a wireless manner disclosed herein, and FIG. 11 is a view illustrating forms of signals upon modulation and demodulation executed in the wireless power transmission disclosed herein.

Referring to FIG. 10, the wireless power signal received through the power reception unit 291 of the wireless power reception device 200, as illustrated in FIG. 11A, may be a non-modulated wireless power signal 51. The wireless power reception device 200 and the wireless power transmission device 100 may establish a resonance coupling according to a resonant frequency, which is set by the resonant circuit 2912 within the power reception unit 291, and the wireless power signal 51 may be received through the reception coil 2911b.

The power reception control unit 292 may modulate the wireless power signal 51 received through the power reception unit 291 by changing a load impedance within the modulation/demodulation unit 293. The modulation/demodulation unit 293 may include a passive element 2931 and an active element 2932 for modulating the wireless power signal 51. The modulation/demodulation unit 293 may modulate the wireless power signal 51 to include a packet, which is desired to be transmitted to the wireless power transmission device 100. Here, the packet may be input into the active element 2932 within the modulation/demodulation unit 293.

Afterwards, the power transmission control unit 112 of the wireless power transmission device 100 may demodulate a modulated wireless power signal 52 through an envelope detection, and decode the detected signal 53 into digital data 54. The demodulation may detect a current or voltage flowing into the power conversion unit 111 to be classified into two states, a HI phase and a LO phase, and acquire a packet to be transmitted by the wireless power reception device 200 based on digital data classified according to the states.

Hereinafter, a process of allowing the wireless power transmission device 100 to acquire a power control message to be transmitted by the wireless power reception device 200 from the demodulated digital data will be described.

Referring to FIG. 11B, the power transmission control unit 112 detects an encoded bit using a clock signal (CLK) from an envelope detected signal. The detected encoded bit is encoded according to a bit encoding method used in the modulation process at the side of the wireless power reception device 200. The bit encoding method may correspond to any one of non-return to zero (NRZ) and bi-phase encoding.

For instance, the detected bit may be a differential bi-phase (DBP) encoded bit. According to the DBP encoding, the power reception control unit 292 at the side of the wireless power reception device 200 is allowed to have two state transitions to encode data bit 1, and to have one state transition to encode data bit 0. In other words, data bit 1 may be encoded in such a manner that a transition between the HI state and LO state is generated at a rising edge and falling edge of the clock signal, and data bit 0 may be encoded in such a manner that a transition between the HI state and LO state is generated at a rising edge of the clock signal.

On the other hand, the power transmission control unit 112 may acquire data in a byte unit using a byte format constituting a packet from a bit string detected according to the bit encoding method. For instance, the detected bit string may be transferred by using an 11-bit asynchronous serial format as illustrated in FIG. 12C. In other words, the detected bit may include a start bit indicating the beginning of a byte and a stop bit indicating the end of a byte, and also include data bits (b0 to b7) between the start bit and the stop bit. Furthermore, it may further include a parity bit for checking an error of data. The data in a byte unit constitutes a packet including a power control message.

[In Case of Supporting in-Band Two-Way Communication]

As aforementioned, FIG. 9 has illustrated that the wireless power reception device 200 transmits a packet using a carrier signal 10a formed by the wireless power transmission device 100. However, the wireless power transmission device 100 may also transmit data to the wireless power reception device 200 by a similar method.

In other words, the power transmission control unit 112 may control the modulation/demodulation unit 113 to modulate data, which is to be transmitted to the wireless power reception device 200, such that the data can be included in the carrier signal 10a. Here, the power reception control unit 292 of the wireless power reception device 200 may control the modulation/demodulation unit 293 to execute demodulation so as to acquire data from the modulated carrier signal 10a.

Packet Format

Hereinafter, description will be given of a structure of a packet used in communication using a wireless power signal according to the exemplary embodiments disclosed herein.

Figure 12:
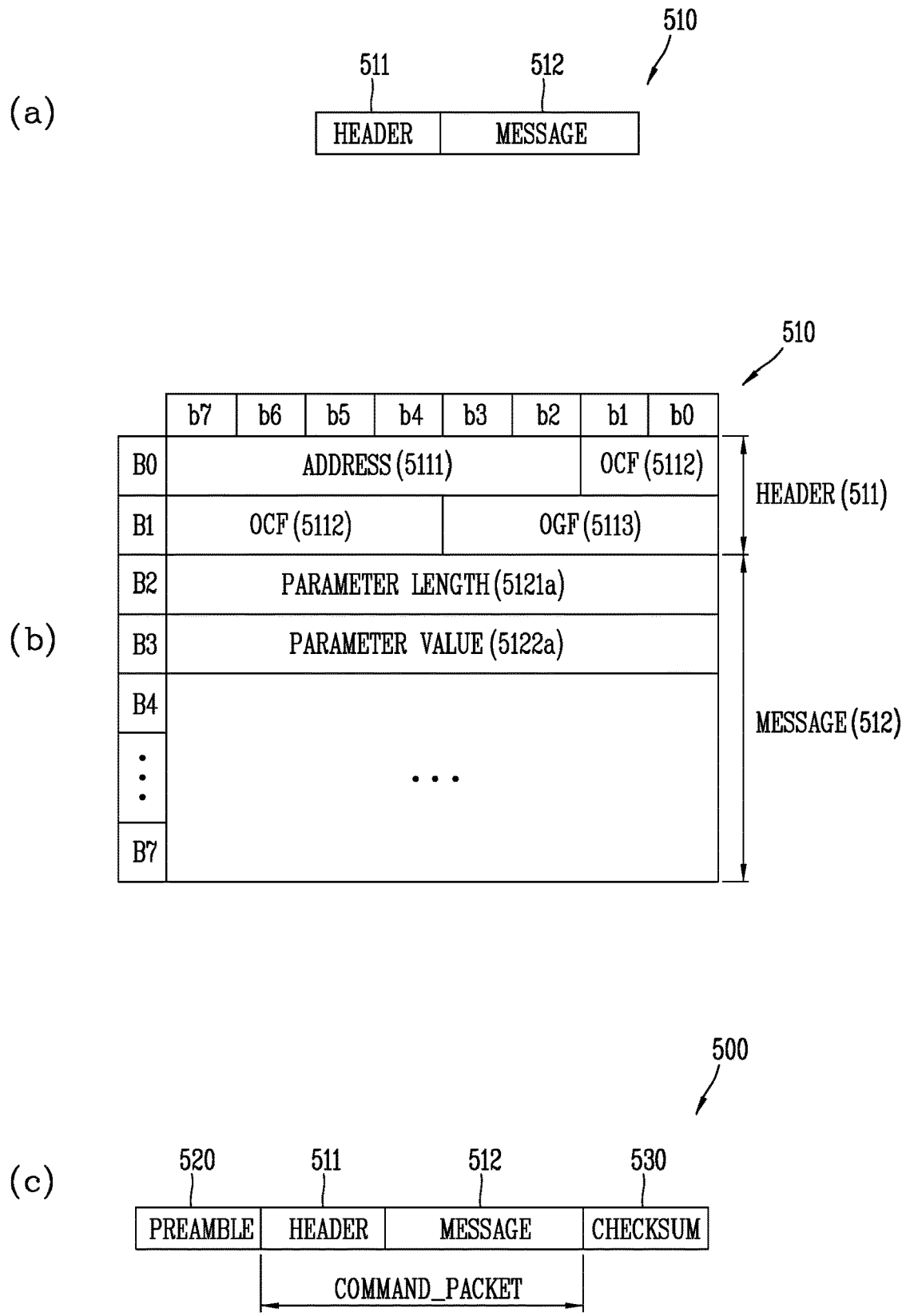
FIG. 12 is a view illustrating a method of showing data bits and byte constituting a power control message provided by the wireless power transmission device 100.

FIG. 12 is a view illustrating a packet including a power control message used in a contactless (wireless) power transfer scheme according to the embodiments disclosed herein.

As illustrated in FIG. 12A, the wireless power transmission device 100 and the wireless power reception device 200 may transmit and receive data desired to transmit in a form of a command packet (command_packet) 510. The command packet 510 may include a header 511 and a message 512.

The header 511 may include a field indicating a type of data included in the message 512. Size and type of the message may be decided based on a value of the field which indicates the type of data.

Furthermore, the header 511 may include an address field for identifying a transmitter (originator) of the packet. For example, the address field may indicate an identifier of the wireless power reception device 200 or an identifier of a group to which the wireless power reception device 200 belongs. When the wireless power reception device 200 transmits the packet 510, the wireless power reception device 200 may generate the packet 510 such that the address field can indicate identification information related to the receiver 200 itself.

The message 512 may include data that the originator of the packet 510 desires to transmit. The data included in the message 512 may be a report, a request or a response for the other party.

On the other hand, according to one exemplary embodiment, the command packet 510 may be configured as illustrated in FIG. 12B. The header 511 included in the command packet 510 may be represented with a predetermined size. For example, the header 511 may have a 2-byte size.

The header 511 may include a reception address field. For example, the reception address field may have a 6-bit size.

The header 511 may include an operation command field (OCF) or an operation group field (OGF). The OGF is a value given for each group of commands for the wireless power reception device 200, and the OCF is a value given for each command existing in each group in which the wireless power reception device 200 is included.

The message 512 may be divided into a length field 5121 of a parameter and a value field 5122 of the parameter. That is, the originator of the packet 510 may generate the message by a length-value pair (5121a-5122a, etc.) of at least one parameter, which is required to represent data desired to transmit.

Referring to FIG. 12C, the wireless power transmission device 100 and the wireless power reception device 200 may transmit and receive the data in a form of a packet which further has a preamble 520 and a checksum 530 added to the command packet 510.

The preamble 520 may be used to perform synchronization with data received by the wireless power transmission device 100 and detect the start bit of the header 520. The preamble 520 may be configured to repeat the same bit. For instance, the preamble 520 may be configured such that data bit 1 according to the DBP encoding is repeated eleven to twenty five times.

The checksum 530 may be used to detect an error that can be occurred in the command packet 510 while transmitting a power control message.

Operation Phases

Hereinafter, description will be given of operation phases of the wireless power transmission device 100 and the wireless power reception device 200.

Figure 13:
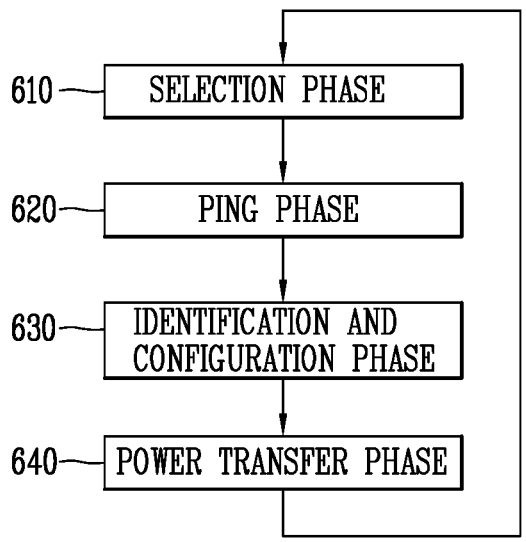
FIG. 13 is a view illustrating a packet including a power control message used in a wireless power transmission scheme according to the embodiments disclosed herein.
Figure 14:
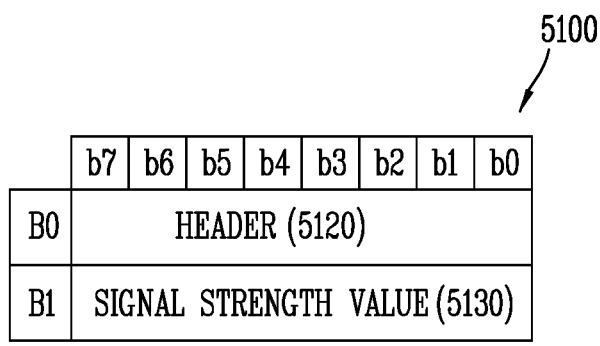

FIG. 13 illustrates the operation phases of the wireless power transmission device 100 and the wireless power reception device 200 according to the embodiments disclosed herein. Furthermore, FIGS. 14 to 18 illustrate the structures of packets including a power control message between the wireless power transmission device 100 and the wireless power reception device 200.

Referring to FIG. 13, the operation phases of the wireless power transmission device 100 and the wireless power reception device 200 for wireless power transmission may be divided into a selection phase (state) 610, a ping phase 620, an identification and configuration phase 630, and a power transfer phase 640.

The wireless power transmission device 100 detects whether or not objects exist within a range that the wireless power transmission device 100 can transmit power in a wireless manner in the selection state 610, and the wireless power transmission device 100 sends a detection signal to the detected object and the wireless power reception device 200 sends a response to the detection signal in the ping state 620.

Furthermore, the wireless power transmission device 100 identifies the wireless power reception device 200 selected through the previous states and acquires configuration information for power transmission in the identification and configuration state 630. The wireless power transmission device 100 transmits power to the wireless power reception device 200 while controlling power transmitted in response to a control message received from the wireless power reception device 200 in the power transfer state 640.

Hereinafter, each of the operation phases will be described in detail.

1) Selection State

The wireless power transmission device 100 in the selection state 610 performs a detection process to select the wireless power reception device 200 existing within a detection area. The detection area, as described above, refers to a region in which an object within the relevant area can affect on the characteristic of the power of the power conversion unit 111. Compared to the ping state 620, the detection process for selecting the wireless power reception device 200 in the selection state 610 is a process of detecting a change of the power amount for forming a wireless power signal in the power conversion unit at the side of the wireless power transmission device 100 to check whether any object exists within a predetermined range, instead of the scheme of receiving a response from the wireless power reception device 200 using a power control message. The detection process in the selection state 610 may be referred to as an analog ping process in the aspect of detecting an object using a wireless power signal without using a packet in a digital format in the ping state 620 which will be described later.

The wireless power transmission device 100 in the selection state 610 can detect that an object comes in or out within the detection area. Furthermore, the wireless power transmission device 100 can distinguish the wireless power reception device 200 capable of transferring power in a wireless manner from other objects (for example, a key, a coin, etc.) among objects located within the detection area.

As described above, a distance that can transmit power in a wireless manner may be different according to the inductive coupling scheme and resonance coupling scheme, and thus the detection area for detecting an object in the selection state 610 may be different from one another.

First, in case where power is transmitted according to the inductive coupling scheme, the wireless power transmission device 100 in the selection state 610 can monitor an interface surface (not shown) to detect the alignment and removal of objects.

Furthermore, the wireless power transmission device 100 may detect the location of the wireless power reception device 200 placed on an upper portion of the interface surface. As described above, the wireless power transmission device 100 formed to include one or more transmission coils may perform the process of entering the ping state 620 in the selection state 610, and checking whether or not a response to the detection signal is transmitted from the object using each coil in the ping state 620 or subsequently entering the identification state 630 to check whether identification information is transmitted from the object. The wireless power transmission device 100 may determine a coil to be used for contactless power transfer based on the detected location of the wireless power reception device 200 acquired through the foregoing process.

Furthermore, when power is transmitted according to the resonance coupling scheme, the wireless power transmission device 100 in the selection state 610 can detect an object by detecting that any one of a frequency, a current and a voltage of the power conversion unit is changed due to an object located within the detection area.

On the other hand, the wireless power transmission device 100 in the selection state 610 may detect an object by at least any one of the detection methods using the inductive coupling scheme and resonance coupling scheme. The wireless power transmission device 100 may perform an object detection process according to each power transmission method, and subsequently select a method of detecting the object from the coupling methods for contactless power transfer to advance to other states 620, 630, 640.

On the other hand, for the wireless power transmission device 100, a wireless power signal formed to detect an object in the selection state 610 and a wireless power signal formed to perform digital detection, identification, configuration and power transmission in the subsequent states 620, 630, 640 may have a different characteristic in the frequency, strength, and the like. It is because the selection state 610 of the wireless power transmission device 100 corresponds to an idle state for detecting an object, thereby allowing the wireless power transmission device 100 to reduce consumption power in the idle state or generate a specialized signal for effectively detecting an object.

2) Ping State

The wireless power transmission device 100 in the ping state 620 performs a process of detecting the wireless power reception device 200 existing within the detection area through a power control message. Compared to the detection process of the wireless power reception device 200 using a characteristic of the wireless power signal and the like in the selection state 610, the detection process in the ping state 620 may be referred to as a digital ping process.

The wireless power transmission device 100 in the ping state 620 forms a wireless power signal to detect the wireless power reception device 200, modulates the wireless power signal modulated by the wireless power reception device 200, and acquires a power control message in a digital data format corresponding to a response to the detection signal from the modulated wireless power signal. The wireless power transmission device 100 may receive a power control message corresponding to the response to the detection signal to recognize the wireless power reception device 200 which is a subject of power transmission.

The detection signal formed to allowing the wireless power transmission device 100 in the ping state 620 to perform a digital detection process may be a wireless power signal formed by applying a power signal at a specific operating point for a predetermined period of time. The operating point may denote a frequency, duty cycle, and amplitude of the voltage applied to the transmitting (Tx) coil. The wireless power transmission device 100 may generate the detection signal generated by applying the power signal at a specific operating point for a predetermined period of time, and attempt to receive a power control message from the wireless power reception device 200.

Figure 15A:
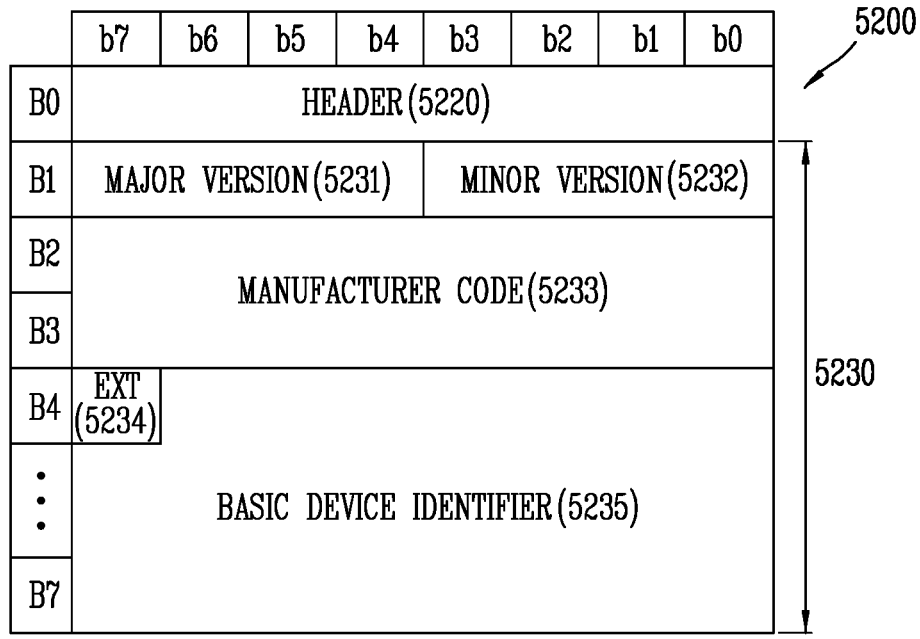
Figure 15B:
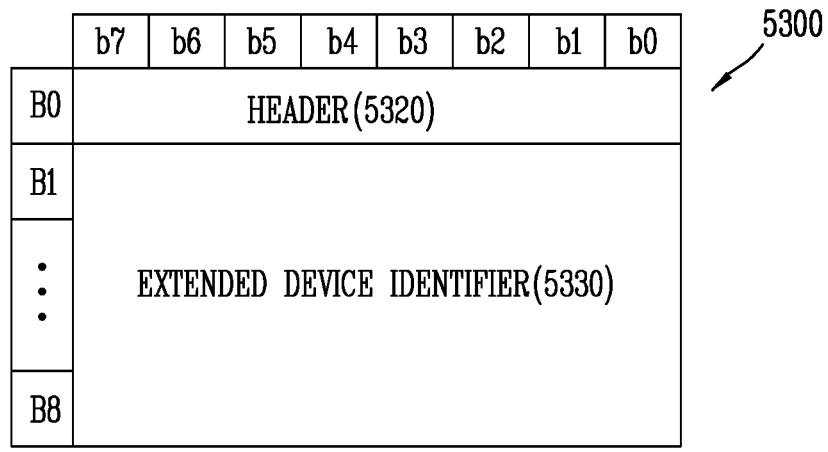

On the other hand, the power control message corresponding to a response to the detection signal may be a message indicating strength of the wireless power signal received by the wireless power reception device 200. For example, the wireless power reception device 200 may transmit a signal strength packet 5100 including a message indicating the received strength of the wireless power signal as a response to the detection signal as illustrated in FIG. 15. The packet 5100 may include a header 5120 for notifying a packet indicating the signal strength and a message 5130 indicating strength of the power signal received by the wireless power reception device 200. The strength of the power signal within the message 5130 may be a value indicating a degree of inductive coupling or resonance coupling for power transmission between the wireless power transmission device 100 and the wireless power reception device 200.

The wireless power transmission device 100 may receive a response message to the detection signal to find the wireless power reception device 200, and then extend the digital detection process to enter the identification and configuration state 630. In other words, the wireless power transmission device 100 maintains the power signal at a specific operating point subsequent to finding the wireless power reception device 200 to receive a power control message required in the identification and configuration state 630.

However, if the wireless power transmission device 100 is not able to find the wireless power reception device 200 to which power can be transferred, then the operation phase of the wireless power transmission device 100 will be returned to the selection state 610.

3) Identification and Configuration State

The wireless power transmission device 100 in the identification and configuration state 630 may receive identification information and/or configuration information transmitted by the wireless power reception device 200, thereby controlling power transmission to be effectively carried out.

The wireless power reception device 200 in the identification and configuration state 630 may transmit a power control message including its own identification information. For this purpose, the wireless power reception device 200, for instance, may transmit an identification packet 5200 including a message indicating the identification information of the wireless power reception device 200 as illustrated in FIG. 16A. The packet 5200 may include a header 5220 for notifying a packet indicating identification information and a message 5230 including the identification information of the electronic device. The message 5230 may include information (2531 and 5232) indicating a version of the contract for contactless power transfer, information 5233 for identifying a manufacturer of the wireless power reception device 200, information 5234 indicating the presence or absence of an extended device identifier, and a basic device identifier 5235. Furthermore, if it is displayed that an extended device identifier exists in the information 5234 indicating the presence or absence of an extended device identifier, then an extended identification packet 5300 including the extended device identifier as illustrated in FIG. 16B will be transmitted in a separate manner. The packet 5300 may include a header 5320 for notifying a packet indicating an extended device identifier and a message 5330 including the extended device identifier. When the extended device identifier is used as described above, information based on the manufacturer's identification information 5233, the basic device identifier 5235 and the extended device identifier 5330 will be used to identify the wireless power reception device 200.

The wireless power reception device 200 may transmit a power control message including information on expected maximum power in the identification and configuration state 630. To this end, the wireless power reception device 200, for instance, may transmit a configuration packet 5400 as illustrated in FIG. 17. The packet may include a header 5420 for notifying that it is a configuration packet and a message 5430 including information on the expected maximum power. The message 5430 may include power class 5431, information 5432 on expected maximum power, an indicator 5433 indicating a method of determining a current of a main cell at the side of the wireless power transmission device, and the number 5434 of optional configuration packets. The indicator 5433 may indicate whether or not a current of the main cell at the side of the wireless power transmission device is determined as specified in the contract for wireless power transmission.

On the other hand, the wireless power transmission device 100 may generate a power transfer contract which is used for power charging with the wireless power reception device 200 based on the identification information and/or configuration information. The power transfer contract may include the limits of parameters determining a power transfer characteristic in the power transfer state 640.

The wireless power transmission device 100 may terminate the identification and configuration state 630 and return to the selection state 610 prior to entering the power transfer state 640. For instance, the wireless power transmission device 100 may terminate the identification and configuration state 630 to find another electronic device that can receive power in a wireless manner.

4) Power Transfer State

The wireless power transmission device 100 in the power transfer state 640 transmits power to the wireless power reception device 200.

The wireless power transmission device 100 may receive a power control message from the wireless power reception device 200 while transferring power, and control a characteristic of the power applied to the transmission coil in response to the received power control message. For example, the power control message used to control a characteristic of the power applied to the transmission coil may be included in a control error packet 5500 as illustrated in FIG. 18. The packet 5500 may include a header 5520 for notifying that it is a control error packet and a message 5530 including a control error value. The wireless power transmission device 100 may control the power applied to the transmission coil according to the control error value. In other words, a current applied to the transmission coil may be controlled so as to be maintained if the control error value is "0," reduced if the control error value is a negative value, and increased if the control error value is a positive value.

The wireless power transmission device 100 may monitor parameters within a power transfer contract generated based on the identification information and/or configuration information in the power transfer state 640. As a result of monitoring the parameters, if power transmission to the wireless power reception device 200 violates the limits included in the power transfer contract, then the wireless power transmission device 100 may cancel the power transmission and return to the selection state 610.

The wireless power transmission device 100 may terminate the power transfer state 640 based on a power control message transferred from the wireless power reception device 200.

For example, if the charging of a battery has been completed while charging the battery using power transferred by the wireless power reception device 200, then a power control message for requesting the suspension of wireless power transmission will be transferred to the wireless power transmission device 100. In this case, the wireless power transmission device 100 may receive a message for requesting the suspension of the power transmission, and then terminate wireless power transmission, and return to the selection state 610.

For another example, the wireless power reception device 200 may transfer a power control message for requesting renegotiation or reconfiguration to update the previously generated power transfer contract. The wireless power reception device 200 may transfer a message for requesting the renegotiation of the power transfer contract when it is required a larger or smaller amount of power than the currently transmitted power amount. In this case, the wireless power transmission device 100 may receive a message for requesting the renegotiation of the power transfer contract, and then terminate contactless power transfer, and return to the identification and configuration state 630.

Figure 20:
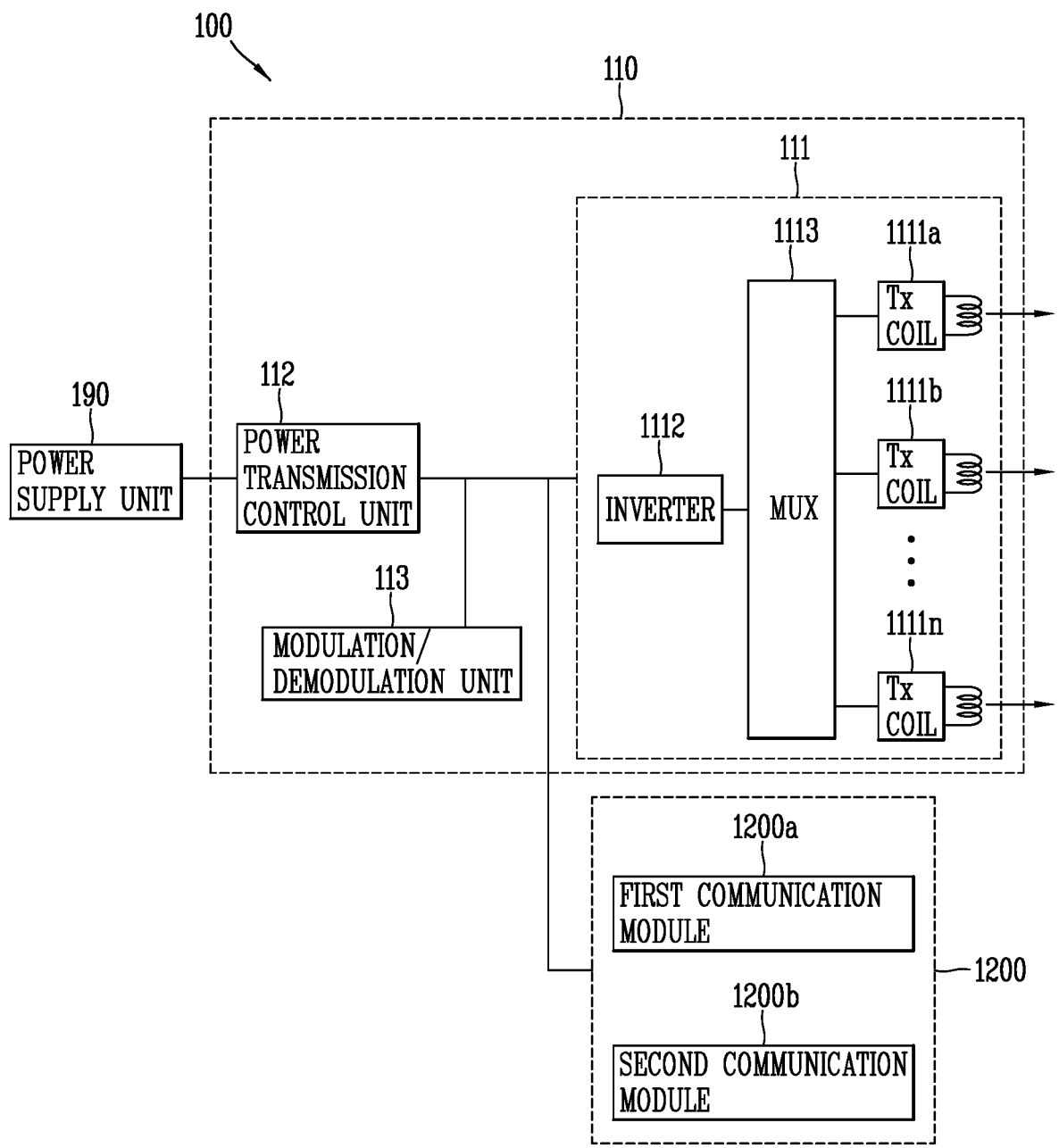
FIGS. 20 and 21 are exemplary block diagrams illustrating part of the configuration of a wireless power transmission device and a wireless power reception device according to the present disclosure.

To this end, a message transmitted by the wireless power reception device 200, for instance, may be an end power transfer packet 5600 as illustrated in FIG. 20. The packet 5600 may include a header 5620 for notifying that it is an end power transfer packet and a message 5630 including an end power transfer code indicating the cause of the suspension. The end power transfer code may indicate any one of charge complete, internal fault, over temperature, over voltage, over current, battery failure, reconfigure, no response, and unknown error.

Communication Method of Plural Electronic Devices

Hereinafter, description will be given of a method by which at least one electronic device performs communication with one wireless power transmission device using wireless power signals.

Figure 19:
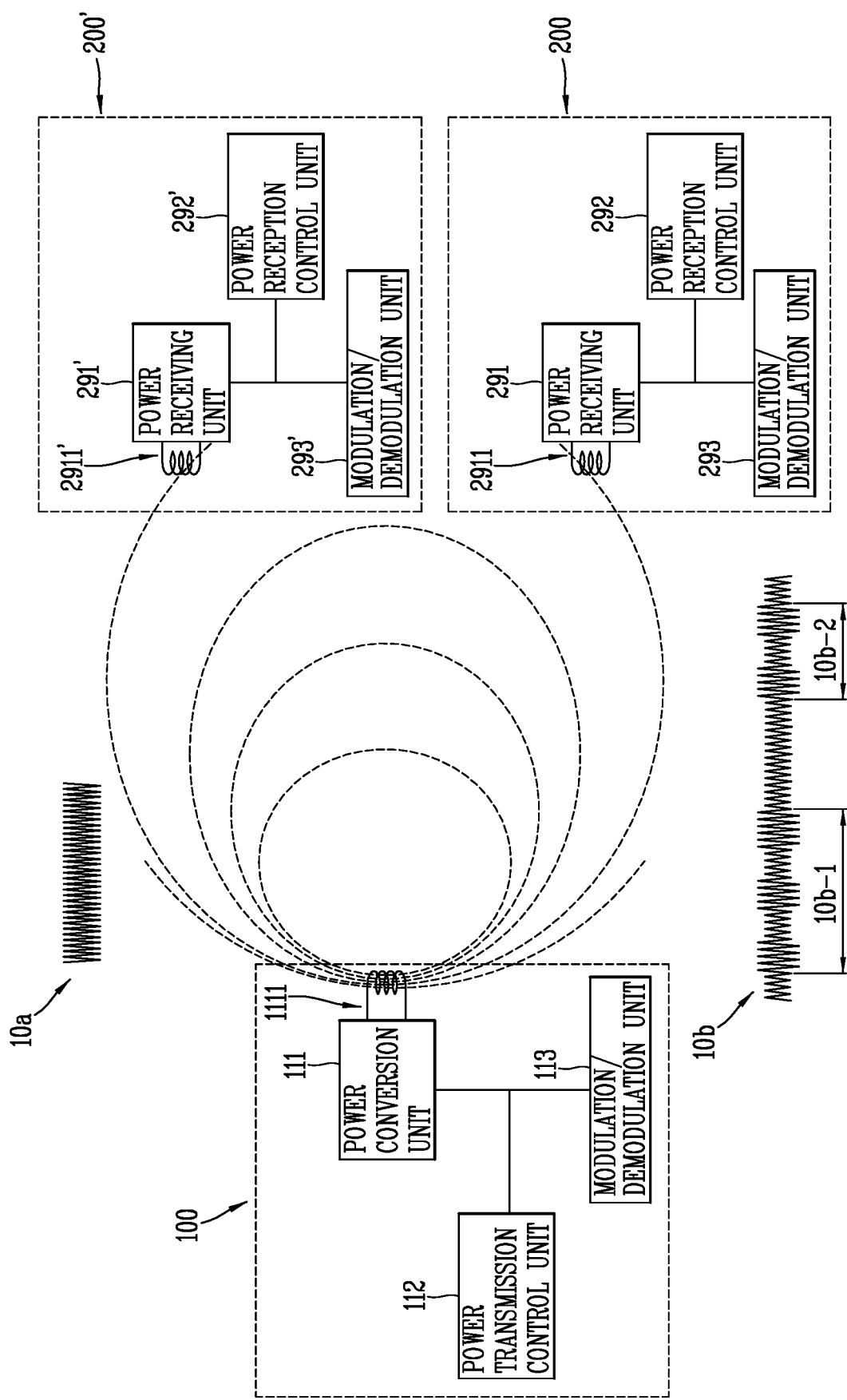
FIG. 19 is a conceptual view illustrating a method of allowing a wireless power transmission device to transfer power to one or more wireless power reception devices.

FIG. 19 is a conceptual view illustrating a method of transferring power to at least one wireless power reception device from a wireless power transmission device.

The wireless power transmission device 100 may transmit power to one or more wireless power reception devices 200 and 200'. FIG. 19 illustrates two electronic devices 200 and 200', but the methods according to the exemplary embodiments disclosed herein may not be limited to the number of electronic devices shown.

An active area and a detection area may be different according to the wireless power transmission scheme of the wireless power transmission device 100. Therefore, the wireless power transmission device 100 may determine whether there is a wireless power reception device located on the active area or the detection area according to the resonance coupling scheme or a wireless power reception device located on the active area or the detection area according to the induction coupling method. According to the determination result, the wireless power transmission device 100 which supports each wireless power transmission scheme may change the power transfer scheme for each wireless power reception device.

In the wireless power transmission according to the exemplary embodiments disclosed herein, when the wireless power transmission device 100 transfers power to the one or more electronic devices 200 and 200' according to the same wireless power transmission scheme, the electronic devices 200 and 200' may perform communications through the wireless power signals without inter-collision.

As illustrated in FIG. 19, a wireless power signal 10*a* generated by the wireless power transmission device 100 may arrive at the first electronic device 200' and the second electronic device 200, respectively. The first and second electronic devices 200' and 200 may transmit wireless power messages using the generated wireless power signal 10*a*.

The first electronic device 200' and the second electronic device 200 may operate as wireless power reception devices for receiving a wireless power signal. The wireless power reception device in accordance with the exemplary embodiments disclosed herein may include a power reception unit 291', 291 to receive the generated wireless power signal, a modulation/demodulation unit 293', 293 to modulate or demodulate the received wireless power signal, and a control unit 292', 292 to control each component of the wireless power reception device.

In the above, a wireless power transmission and reception method of the present disclosure has been described with reference to the WPC standard. Moreover, the present disclosure proposes a wireless power transmission device, a wireless power reception device, and a wireless charging system for medium power.

Here, a wireless power transmission device for medium power denotes a wireless power transmission device that transmits medium-power wireless power to a wireless power reception device. Moreover, the wireless power reception device for medium power denotes a wireless power reception device for receiving medium power transmitted from the wireless power transmission device.

Here, medium power denotes electric power of several tens W or more, and appliances using such medium power may include a citrus press, a hand blender, a blender, a juicer, a smart pan, an electric kettle, a rice cooker, and the like.

On the other hand, according to Guaranteed Power, such household appliances may be classified into Class A, Class B and Class C as shown in Table 1 below.

TABLE 1

| Appliance Class | Diameter | Guaranteed Power |
|---|---|---|
| A | 18-24 cm | 2.4 kW |
| B | 13-17 cm | 800 W |
| C | 8-12 cm | 200 W |

The above Table 1 is a specification for each class proposed by KWG (Kitchen Working Group), which is established for the discussion of the specification for medium power in the Wireless Power Consortium (WPC). Here, diameter means a diameter of a reception coil in a wireless power reception device or a diameter of a transmission coil in a wireless power transmission device for middle power household appliances.

In a wireless charging system for medium power, a transmission and reception coil having a high inductance is used for high efficiency, and a high voltage of several tens to several hundreds of volts is induced in such a transmission and reception coil.

Meanwhile, a wireless power transmission device transmits and receives signals for analog ping and digital ping to and from a wireless power reception device to check whether the wireless power reception device is located in a power transmission area. At this time, when the wireless power transmission device radiates signals for analog ping and digital ping from a transmission coil, similarly to low power products, there may exist in satisfying electromagnetic regulations, very poor power efficiency, and implementing a system.

Therefore, the present disclosure proposes a communication method capable of checking whether a wireless power reception device is located in a power transmission area even when wireless signals are not radiated from a transmission coil at preset intervals, periodically or from time to time to check whether the wireless power reception device is located in the power transmission area.

Meanwhile, according to the present disclosure, a state in which an analog ping is carried out to determine whether the wireless power reception device is located in the wireless power transmission device is referred to as a "standby mode", and a process of performing a digital ping and transferring wireless power subsequent to completing the execution of the analog ping is referred to as a "wake-up mode".

In other words, a wireless power transmission device according to the present disclosure operates in a standby mode in a previous stage of the process of performing communication to transfer wireless power between the wireless power transmission device and the wireless power reception device and transferring wireless power. In the standby mode, a magnetic flux change of a transmission coil in the wireless power transmission device may not occur. In other words, in this case, the transmission coil is not driven. As described above, the present disclosure proposes a method of performing wireless power transmission and communication signal transfer through additional constituent elements to prevent power loss due to communication between a wireless power transmission device and a wireless power reception device. Hereinafter, the present disclosure will be described in more detail with reference to the accompanying drawings.

Figure 21:
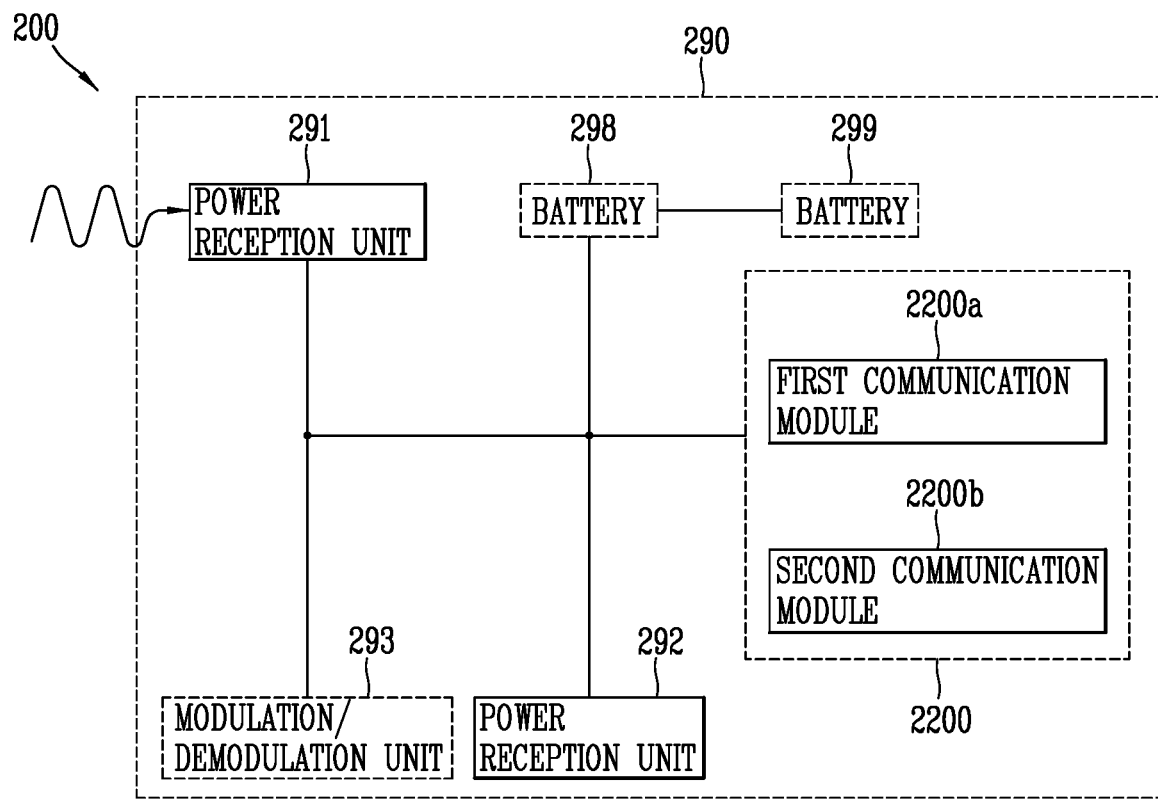
Figure 22A:
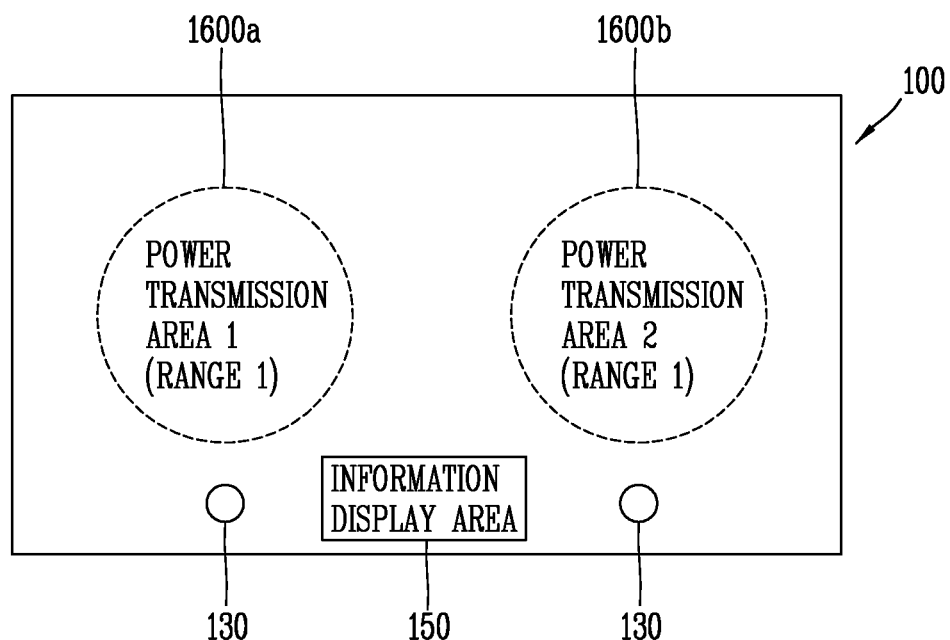
FIGS. 22A, 22B and 23 are conceptual views for explaining a wireless power transmission device and a wireless power reception device illustrated in FIGS. 20 and 21.
Figure 22B:
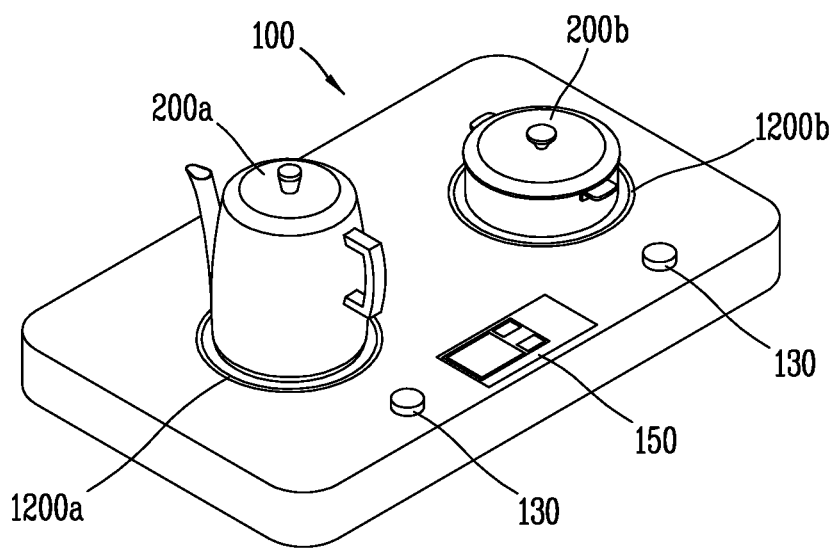
Figure 23:
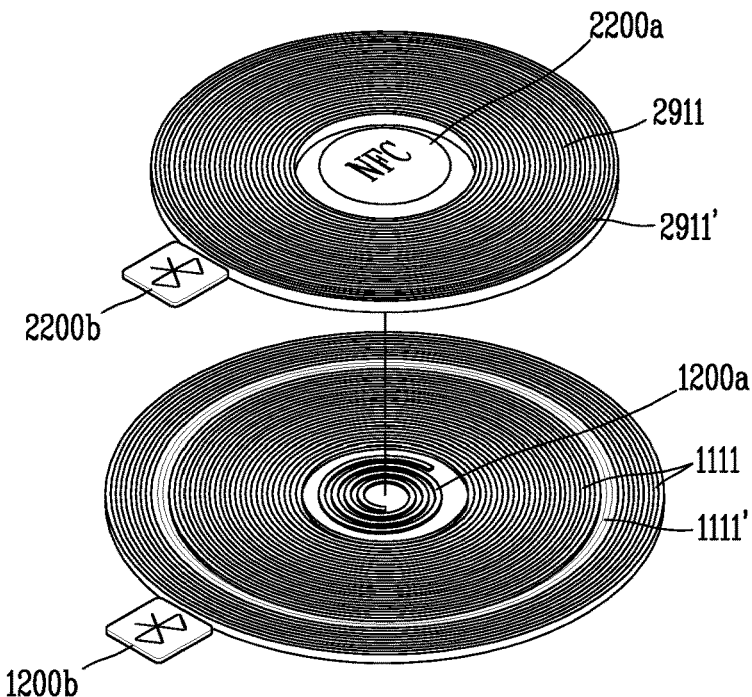

FIGS. 20 and 21 are exemplary block diagrams illustrating part of the configuration of a wireless power transmission device and a wireless power reception device according to the present disclosure, and FIGS. 22A, 22B and 23 are conceptual views for explaining a wireless power transmission device and a wireless power reception device illustrated in FIGS. 20 and 21. In the following description, a wireless power transmission device and a wireless power reception device that transmit and receive power according to an inductive coupling scheme will be described as an example, but a communication scheme between the wireless power transmission device and the wireless power reception device may also be applicable to a wireless power transmission device and a wireless power reception device according to a resonance coupling scheme.

First, referring to FIG. 20, the wireless power transmission device 100 is configured to include a power transmission unit 110, a communication unit 1200, and a power supply unit 190. The power transmission unit 110 may include a power conversion unit 111 and a power transmission control unit 112 (hereinafter, referred to as a "control unit").

The power conversion unit 111 converts power supplied from the transmission side power supply unit 190 into a wireless power signal to transfer the wireless power signal to the wireless power reception device 200 illustrated in FIG. The wireless power signal transferred by the power conversion unit 111 is formed in the form of a magnetic field or electro-magnetic field having an oscillation characteristic. For this purpose, the power conversion unit 111 may be configured to include a coil for generating the wireless power signal.

The power conversion unit 111 may include a constituent element for forming a different type of wireless power signal according to each power transfer scheme. For example, the power conversion unit 111 may include a primary coil (hereinafter referred to as a "transmission coil", 1111a, 1111b, . . . 1111n) that forms a changing magnetic field to induce a current in a secondary coil of the wireless power reception device 200.

Furthermore, the power conversion unit 111 may transfer power using the foregoing inductive coupling scheme.

On the other hand, the power conversion unit 111 may further include a circuit for controlling the characteristics of a frequency, an applied voltage, a current or the like, which are used to form the wireless power signal.

The control unit 112 controls an overall operation of each constituent element included in the power transmission unit 110 and the wireless power transmission device such as the communication unit 1200 and the power supply unit 190.

Meanwhile, an area where the wireless power signal can reach may be divided into two areas. First, an active area denotes a region through which a wireless power signal transferring power to the wireless power reception device 200 is passed. Next, a semi-active area denotes an area of interest in which the wireless power transmission device 100 can sense the existence of the wireless power reception device 200. Here, the control unit 112 may sense whether the wireless power reception device 200 is placed in the active area or semi-active area or removed from the area. Hereinafter, such an active area and a semi-active area will be collectively referred to as a "power transmission area".

Meanwhile, a power transmission device according to the present disclosure may perform an analog ping process and a digital ping process described above through communication between the communication unit 1200 and the wireless power reception device 200. Here, the analog ping process refers to a process of detecting the wireless power reception device 200 to select the wireless power reception device 200 existing in power transmission areas 1600a, 1600b as illustrated in FIG. 22A. As described above, the power transmission area 1600a, 1600b are areas where an object in the relevant area can affect the characteristics of the power of the power conversion unit 111.

More specifically, as illustrated in FIG. 22A, a plurality of power transmission areas 1600a, 1600b may exist depending on a number of coils for transferring wireless power.

According to the present disclosure, the control unit 112 may use the first communication module 1200a provided in the communication unit 1200 to detect whether the wireless power reception devices 200a, 200b is located in the power transmission area 1600a, 1600b as illustrated in FIG. 22B. In other words, the control unit 112 performs an analog ping process for sensing whether there exists a reception device capable of transmitting wireless power in the power transmission area 1600a, 1600b using the first communication module 1200a provided in the communication unit 1200.

Here, the first communication module 1200a may be an NFC (Near Field Communication) communication module that performs short-range communication.

Here, a short-range communication module, which is the first communication module 1200a, recognizes an object through a short-range wireless signal using a frequency range of 13.56 Mhz, which is one type of RFID, wherein it is also expressed as short-range wireless communication, short-range communication, short-range magnetic field communication or short-range magnetic field communication or adjacent magnetic field communication, and may also be expressed as "using Near Field Communication (NFC)".

Furthermore, such short-range wireless communication may allow data communication only by bringing a power reception device within a range of several centimeters (cm) to several tens of centimeters (cm).

On the other hand, a power transmission coil (or a transmission coil 1111) is provided at a lower end of the power transmission area 1600a, 1600b as illustrated in FIG. 23, and the first communication module 1200a may be provided with a power transmission coil at a lower end of the power transmission area 1600a, 1600b along with the transmission coil 1111. Thus, as illustrated in FIG. 22B, it may be possible to sense a power reception device 200a, 200b located in the power transmission area 1600a, 1600b.

Here, the power reception device 200a, 200b should be provided with an NFC communication module 2200a (refer to FIG. 23). The NFC communication module included in the power reception device may be a tag, a sticker or a card with a built-in microchip.

In other words, the first communication module 1200a senses a tag, a sticker or a card with the built-in microchip based on that the power reception device 200a, 200b is tagged with the power transmission area 1600a, 1600b to read information stored in the tag, sticker or card containing the microchip.

Meanwhile, a short-range communication module corresponding to the first communication module 1200a included in the power transmission area 1600a, 1600b may be may be designed in such a manner that a range or distance capable of performing short-range communication corresponds to a range of the relevant power transmission area to sense a wireless power reception device located adjacent to or in the relevant power transmission area.

As described above, it may be possible to determine whether a wireless power reception device is located in the power transmission area 1600a, 1600b through a short-range communication module.

In other words, a wireless power transmission device according to the present disclosure may sense a wireless power reception device in a standby mode in which an analog ping process is carried out, using a transmission coil even without radiating a signal, thereby reducing standby power in the standby mode.

Meanwhile, the first communication module 1200a may read information included in an NFC tag, a sticker or a card of the wireless power reception device through short-range communication with the wireless power reception device, wherein the information may include at least part of various information such as product information, identification information, communication module information, communication information, and a Bluetooth (BLE) address of the power reception device.

Meanwhile, the control unit 112 may perform a process of identifying the wireless power reception device 200 through the first communication module 1200a according to a result of detecting the existence of the wireless power reception device 200 or determine whether to start wireless power transmission.

In addition, the control unit 112 may determine at least one of a frequency, a voltage, and a current of the power conversion unit 111 for forming the wireless power signal. The determination of the characteristics may be made according to a condition of the wireless power transmission device 100 or a condition of the wireless power reception device 200.

The control unit 112 may receive a power control message from the wireless power reception device 200. The control unit 112 may determine one or more characteristics of the frequency, voltage, and current of the power conversion unit 111 based on the received power control message, and may further perform another control operation based on the power control message.

For example, the control unit 112 may determine one or more characteristics of a frequency, a current, and a voltage used to form the wireless power signal according to a power control message including at least one of rectified power amount information, charging state information and identification information in the wireless power reception device 200.

Furthermore, as another control operation using the power control message, the wireless power transmission device 100 may perform a typical control operation associated with wireless power transmission based on the power control message. For example, the wireless power transmission device 100 may receive information associated with the wireless power reception device 200 to be auditorily or visually outputted through the power control message, or receive information required for authentication between devices.

Meanwhile, the power control message may be transmitted and received through the second communication module 1200b included in the communication unit 1200. The second communication module 1200b may be a Bluetooth communication module. As described in the present disclosure, when a Bluetooth communication module is used, it may be possible to solve problematic data transmission amount limitation (80 bits) when establishing a communication environment only with in-band, thereby providing a solution capable of transmitting the power, type, and state of the reception unit at once. In other words, according to the communication specification of Bluetooth (or BLE), it may be possible to transmit a data rate of maximum 1 Mbit/s, thereby transmitting a vast amount of data of 750 bytes=6000 bits (effective data: 512 bytes=4096 bits) during a duration of 6 msec.

In case of using BLE communication in this manner, a process of sending information with several data packets in a separated manner, and then de-segmenting the data and the like to overcome the limited amount of data in in-band may not be required, thereby greatly enhancing system complexity.

As described above, according to the present disclosure, it may be possible to perform communication with a wireless power reception device using BLE (Bluetooth 4.0 or higher Bluetooth Low Energy) and NFC, which are out-of-band schemes other than an in-band (or time multiplexing) communication protocol that is basically used in WPC.

On the other hand, the control unit 112 may sense whether a wireless power reception device exists in the power transmission area 1600a, 1600b through the first communication module, and transmit and receive control messages to and from the wireless power reception device in response to the sensed device through the second communication module. In other words, according to the present disclosure, a transmission coil may be used only to transfer wireless power to the wireless power reception device, and thus it may not be required to radiate a medium or high-power current to the transmission coil to perform an analog ping process and a digital ping process with the wireless power reception device.

Meanwhile, as described above, the power conversion unit 111 of the wireless power transmission device 100 according to the present disclosure may be configured with one or more transmission coils 1111a-1 to 1111a-n. The one or more transmission coils 1111a-1 to 1111a-n may respectively form a power transmission area.

As illustrated in FIG. 23A, one or more of the transmission coils 1111a-1 to 1111a-n may be mounted at the bottom of an interface surface. In other words, one or more of the transmission coils 1111a-1 to 1111a-n may be respectively located below the power transmission area 1600a, 1600. A transmission coil disposed to correspond to each power transmission area may be driven independently from coils disposed in other power transmission areas. In other words, the wireless power transmission device is able to drive only one transmission coil located to correspond to the first power transmission area 1600a between transmission coils provided in the first and second power transmission areas 1600a, 1600, respectively.

On the other hand, each of the one or more transmission coils may be provided with first and second communication modules 1200a, 1200b, respectively, as illustrated in FIG. 23. In other words, each of the transmission coils may be provided with first and second communication modules 1200a, 1200b, respectively, communicating with a wireless power reception device for power transfer through the relevant transmission coil.

Furthermore, the power conversion unit 111 may further include a multiplexer 1113 for establishing and releasing a connection of some of the one or more transmission coils 1111a-1 to 1111a-n.

When a position of the wireless power reception device 200 (refer to 200a, 200b in FIG. 22) placed on the interface surface is sensed, the power transmission control unit 112 may control the multiplexer 1113 to connect coils having an inductive coupling relationship with a reception coil 2911a of the wireless power reception device 200 among the one or more transmission coils 1111a-1 to 1111a-n in consideration of the sensed position of the wireless power reception device 200.

Here, the position of the wireless power reception device 200 may be sensed through the foregoing first communication module 1200a. In other words, NFC communication modules are provided at a lower end of the power transmission area 1600a, 1600b, respectively, to sense a wireless power reception device located in the relevant power transmission area.

Furthermore, the power conversion unit 111 may further include an impedance matching unit (not shown) for controlling an impedance to form a resonant circuit with coils connected thereto.

As described above, a wireless power transmission device according to the present disclosure may communicate with a wireless power reception device using BLE (Bluetooth 4.0 or higher Bluetooth Low Energy) and NFC, which are out-of-band schemes.

On the other hand, according to the present disclosure, in a wireless power transmission device may periodically check periodically whether a wireless power reception device that is currently performing BLE communication using the first communication module 1600a, namely, a NFC communication module, is continuously located in a power transmission area in which the BLE communication module is disposed. In other words, in case of using out-of-band communication as in the case of BLE, even when the wireless power reception device is not located in the power transmission area, the control unit 112 does not recognize the position change, and thus power may be continuously supplied to the wireless power reception device through the transmission coil. Therefore, in such a case, it may be possible to check whether the wireless power reception device is located in the power transmission area, using the first communication module, namely, the NFC communication module, even in a state that power is being transferred to the wireless power reception device.

Meanwhile, as illustrated in FIG. 23, the wireless power transmission device according to the present disclosure may of course further include a communication coil 1111' for performing in-band communication even when out-of-band communication is carried out.

In this case, the wireless power transmission device according to the present disclosure may perform either or both of out-of-band communication and in-band communication.

Meanwhile, for in-band and out-of-band communication, a wireless power reception device that is a communication target should also of course include a communication coil 2911' or communication module 2200a, 2200b for in-band and out-of-band communication.

Hereinafter, a wireless power reception device receiving wireless power from a wireless power transmission device according to the present disclosure will be described.

The wireless power reception device 200 is configured to include a power supply unit 290. The power supply unit 290 supplies power required for the operation of the wireless power reception device 200. The power supply unit 290 may include a power reception unit 291, a power reception control unit 292, and a communication unit 2200.

The power reception unit 291 receives power transferred from the wireless power transmission device 100 in a wireless manner.

The power reception unit 291 may include a constituent element required to receive the wireless power signal according to a wireless power transmission scheme. In addition, the power reception unit 291 may receive power according to one or more wireless power transmission schemes. In this case, the power reception unit 291 may include constituent elements required according to each scheme.

First, the power reception unit 291 may be configured to include a coil for receiving a wireless power signal transferred in the form of a magnetic field or electromagnetic field having an oscillating characteristic.

For instance, the power reception unit 291 may include a secondary coil in which a current is induced by a changing magnetic field.

On the other hand, the power reception unit 291 may further include a rectifier and a regulator for converting the wireless power signal into a direct current. Furthermore, the power reception unit 291 may further include a circuit for preventing an overvoltage or overcurrent from occurring due to the received power signal.

The power reception control unit 292 controls each constituent element included in the power supply unit 290.

Specifically, the power reception control unit 292 may transfer a power control message to the wireless power transmission device 100. The power control message may be a message for instructing the wireless power transmission device 100 to start or terminate the transfer of a wireless power signal.

The power control message may be transferred by the communication unit 2200.

The power reception control unit 292, the first communication module 2200a, may be an NFC communication module or a tag, a sticker or a card with a built-in microchip.

When communication between the first communication module 2200a and the wireless power transmission device is completed, a power control message is transmitted to the wireless power transmission device through the second communication module, namely, the Bluetooth communication module 2200b.

Meanwhile, as illustrated in FIG. 23, the wireless power transmission device according to the present disclosure may of course further include a communication coil 2911' for performing in-band communication even when out-of-band communication is carried out. In this case, the wireless power transmission device according to the present disclosure may perform either or both of out-of-band communication and in-band communication.

Meanwhile, for in-band and out-of-band communication, a wireless transmission device that is a communication target should also of course include a communication coil 1111' or communication module 1200a, 1200b.

In order to transmit the power control message, the wireless power reception device 200 may be configured to further include a power communication modulation/demodulation unit 293 electrically connected to the power reception unit 291. The modulation/demodulation unit 293 may be used to transmit the power control message through the wireless power signal as in the case of the wireless power transmission device 100 described above. The modulation/demodulation unit 293 may be used as a means for controlling a current and/or a voltage flowing through the power conversion unit 111 of the wireless power transmission device 100. Hereinafter, a method in which the modulation/demodulation units 113 and 293 of the wireless power transmission device 100 and the wireless power reception device 200, respectively, are used to transmit and receive a power control message through a wireless power signal.

A wireless power signal formed by the power conversion unit 111 is received by the power reception unit 291. At this time, the power reception control unit 292 controls the modulation/demodulation unit 293 of the wireless power reception device 200 to modulate the wireless power signal. For instance, the power reception control unit 292 may change a reactance of the modulation/demodulation unit 293 connected to the power reception unit 291, thereby performing a modulation process to change an amount of power received from the wireless power signal according to the changed reactance. A change in the amount of power received from the wireless power signal results in a change in the current and/or voltage of the power conversion unit 111 forming the wireless power signal. At this time, the modulation and demodulation unit 113 of the wireless power transmission device 100 senses a change of the current and/or the voltage of the power conversion unit 111 to perform a demodulation process.

In other words, the power reception control unit 292 generates a packet including a power control message to be transferred to the wireless power transmission device 100 to modulate the wireless power signal so as to include the packet, and the transmission control unit 112 may decode the packet based on a demodulation process result of the modulation/demodulation unit 113, thereby obtaining the power control message included in the packet.

In addition, the power supply unit 290 may be configured to further include a charging unit 298 and a battery 299.

The wireless power reception device 200 that receives power for operation from the power supply unit 290 operates by power transferred from the wireless power transmission device 100 or charges the battery 299 using the transferred power and then operates by power charged to the battery 299. At this time, the power reception control unit 292 may control the charging unit 298 to perform charging using the transferred power.

Figure 24:
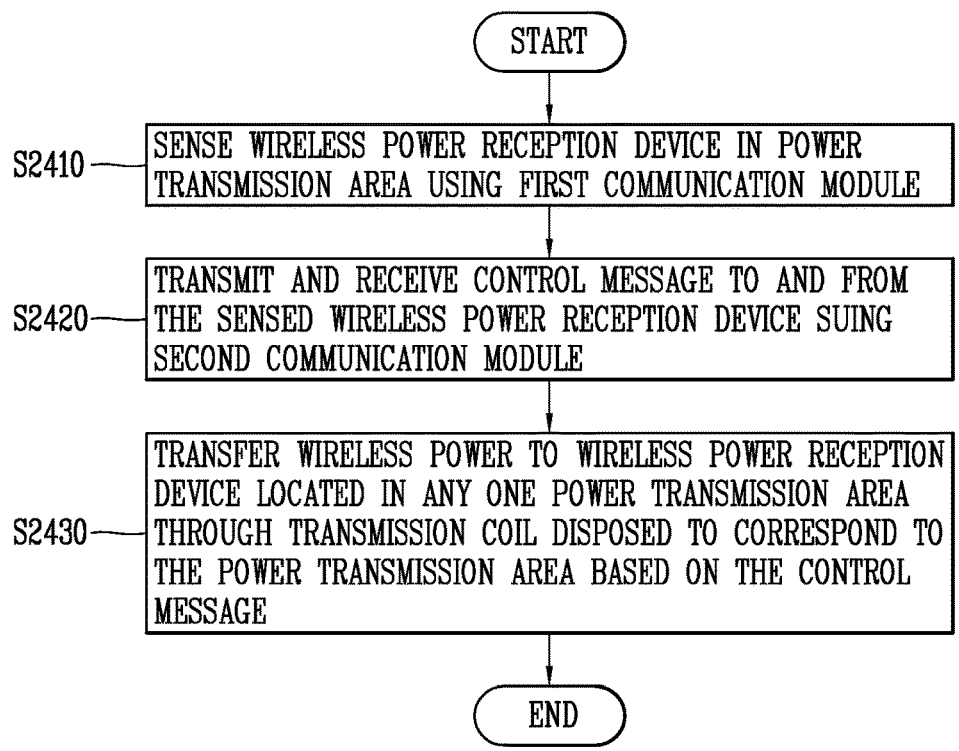
FIGS. 24 and 25 are flow charts for explaining a process of transmitting power from a wireless power transmission device to a wireless power reception device according to the present disclosure.
Figure 25:
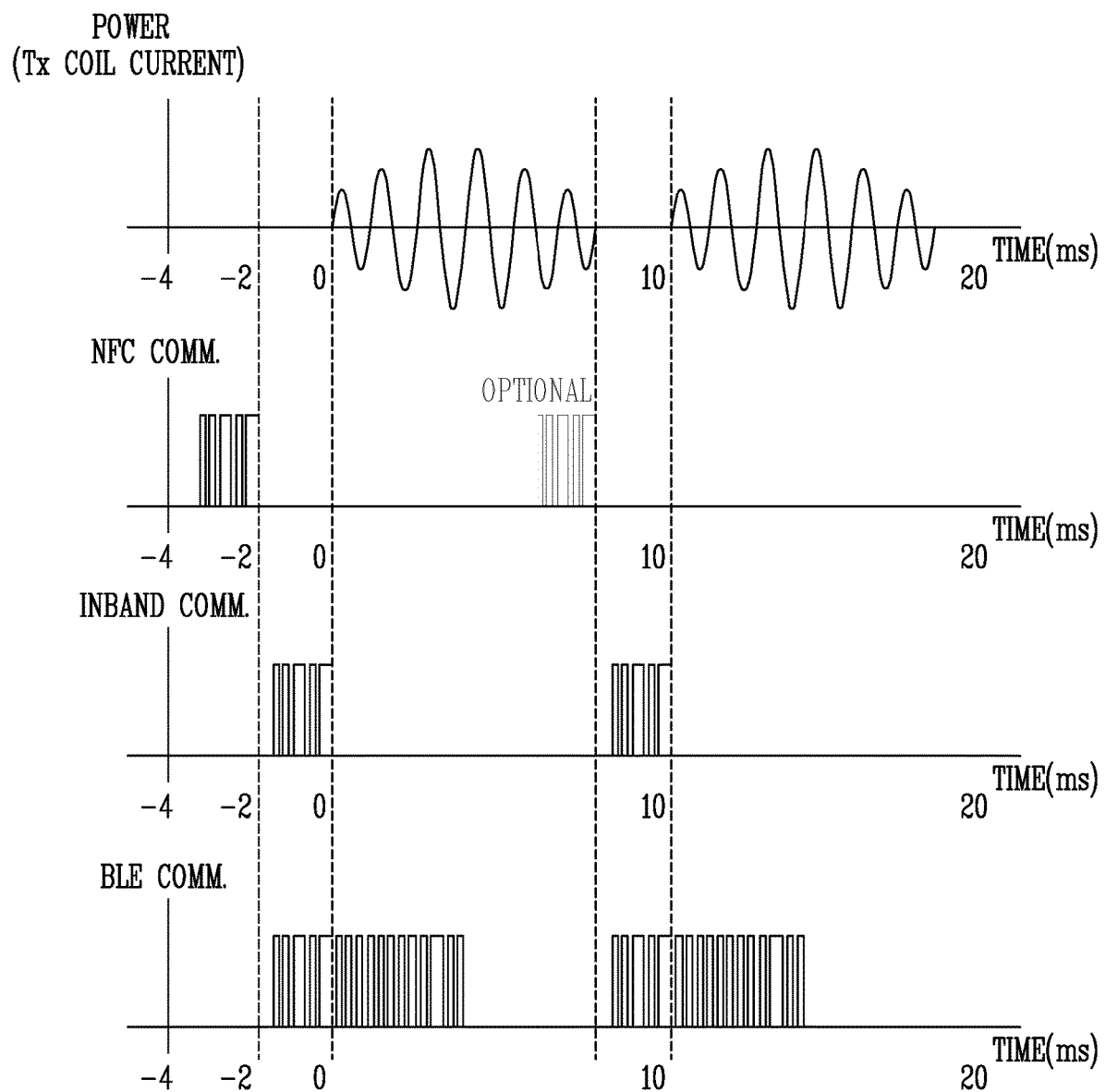

Hereinafter, a process of transmitting power to a wireless power reception device through the configuration of a communication unit of a wireless power transmission device will be described in detail with reference to the accompanying drawings. FIGS. 24 and 25 are flow charts for explaining a process of transmitting power from a wireless power transmission device to a wireless power reception device according to the present disclosure, and FIGS. 26, 27A, 27B, 28A and 28B are conceptual views for explaining a method of performing different controls according to the state of a wireless power reception device located in a wireless power transmission device according to the present disclosure.

Figure 26:
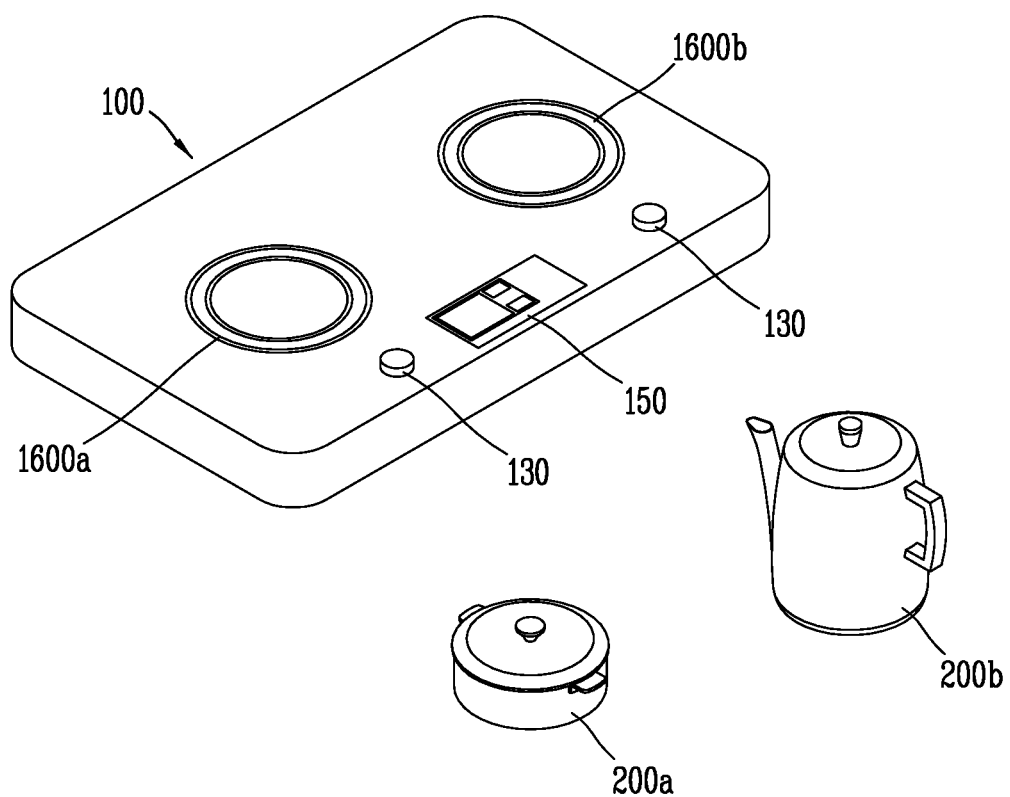
FIGS. 26, 27A, 27B, 28A and 28B are conceptual views for explaining a method of performing different controls according to the state of a wireless power reception device located in a wireless power transmission device according to the present disclosure.

First, referring to FIG. 24, a wireless power transmission device according to the present disclosure carries out a process of sensing that a wireless power reception device 200*a*, 200*b* is located in a power transmission area 1600*a*, 1600*b*, as illustrated in FIG. 26, using a first communication module 1200*a* provided in a communication unit 1200 (S2410). In other words, the wireless power transmission device performs an analog ping process for sensing whether a reception device capable of transmitting wireless power exists in a power transmission area 1600*a*, 1600*b* using the first communication module 1200*a* provided in the communication unit 200.

Here, the first communication module 1200*a* may be an NFC (Near Field Communication) communication module that performs short-range communication. Here, a short-range communication module, which is the first communication module 1200*a*, recognizes an object through a short-range wireless signal using a frequency range of 13.56 Mhz, which is one type of RFID, wherein it is also expressed as short-range wireless communication, short-range communication, short-range magnetic field communication or short-range magnetic field communication or adjacent magnetic field communication, and may also be expressed as "using Near Field Communication (NFC)".

A power transmission coil (or transmission coil 1111), a first communication module 1200*a*, and a second communication module 1200*b* are respectively provided at a lower end of the power transmission area 1600*a*, 1600*b*. Accordingly, the control unit 112 may sense the power reception device 200*a*, 200*b* located in the power transmission area 1600*a*, 1600*b* through the first communication module 1200*a*, namely, the NFC communication module, located in the relevant area.

At this time, the power reception device 200*a*, 200*b* may of course include the NFC communication module 2200*a* (refer to FIG. 23). The NFC communication module included in the power reception device may be a tag, a sticker or a card with a built-in microchip.

In other words, the first communication module 1200*a* senses a tag, a sticker or a card with the built-in microchip based on that the power reception device 200*a*, 200*b* is tagged with the power transmission area 1600*a*, 1600*b* to read information stored in the tag, sticker or card containing the microchip.

Meanwhile, the first communication module 1200*a* may read information included in an NFC tag, a sticker or a card of the wireless power reception device through short-range communication with the wireless power reception device, wherein the information may include the Bluetooth address (BLE address) information of the power reception device.

When communication with the wireless power reception device 200 is successfully carried out through the first communication module 1200*a* in step S2410, a process of transmitting and receiving a power control message (or control message) with the sensed wireless power reception device through the second communication module 1200*b* is carried out (S2420). As described above, the power control message may be transmitted and received through Bluetooth communication. Meanwhile, when the wireless power reception device 200 is sensed through the first communication module 1200*a*, the control unit 112 performs pairing between the second communication module 1200*b* and the second communication module 2200*a* of the wireless power reception device.

The control unit 112 may determine one or more characteristics of the frequency, voltage, and current of the power conversion unit 111 based on the received power control message, and may further perform another control operation based on the power control message.

On the other hand, when a Bluetooth communication module is used as the second communication module 1200*b*, it may be possible to solve problematic data transmission amount limitation (80 bits) when establishing a communication environment only with in-band, thereby providing a solution capable of transmitting the power, type, and state of the reception unit at once. In other words, according to the communication specification of Bluetooth (or BLE), it may be possible to transmit a data rate of maximum 1 Mbit/s, thereby transmitting a vast amount of data of 750 bytes=6000 bits (effective data: 512 bytes=4096 bits) during a duration of 6 msec.

In case of using BLE communication in this manner, a process of sending information with several data packets in a separated manner, and then de-segmenting the data and the like to overcome the limited amount of data in in-band may not be required, thereby greatly enhancing system complexity.

As described above, according to the present disclosure, it may be possible to perform communication with a wireless power reception device using BLE (Bluetooth 4.0 or higher Bluetooth Low Energy) and NFC, which are out-of-band schemes other than an in-band (or time multiplexing) communication protocol that is basically used in WPC.

On the other hand, when a power control message is received from the wireless power reception device 200, the wireless power transmission device carries out a process of transferring wireless power to a wireless power reception device located in any one of a plurality of power transmission areas 1600*a*, 1600*b* through a transmission coil disposed to correspond to the any one power transmission area, as illustrated in FIG. 26, based on the received control message (S2430).

On the other hand, the control unit 112 may sense whether a wireless power reception device exists in the power transmission area 1600*a*, 1600*b* through the first communication module, and transmit and receive control messages to and from the wireless power reception device in response to the sensed device through the second communication module. In other words, according to the present disclosure, a transmission coil may be used only to transfer wireless power to the wireless power reception device, and thus it may not be required to radiate a medium- or high-power current to the transmission coil to perform an analog ping process and a digital ping process with the wireless power reception device.

Meanwhile, considering a time point at which NFC communication and Bluetooth communication are carried out between a wireless power transmission device and a wireless power reception device, as illustrated in FIG. 25, when a wireless power reception device having an NFC tag is placed on a power transmission area, a wireless power transmission device may complete the transmission and reception of information of the wireless power reception device within 2 msec, and when NFC communication is successfully carried out, the Bluetooth communication is started. At the time of performing NFC communication, the wireless power transmission device may be driven in a standby mode in which the power conversion unit and the second communication module are inactivated.

On the other hand, when NFC communication is successfully carried out, the wireless power transmission device may switch the standby mode to a wakeup mode in which the power conversion unit and the second communication module are activated. When NFC communication fails, the wireless power transmission device continuously repeats NFC readings. Meanwhile, at this time, in-band communication may be immediately carried out even though NFC communication fails depending on the system version and setting.

Meanwhile, when NFC communication is successfully carried out, the wireless power transmission device starts Bluetooth (BLE) communication, and in case of BLE communication, the start timing/period is the same as that of in-band communication, but has an interval of at least 4 msec, for example, 6 msec.

On the other hand, according to the present disclosure, in a wireless power transmission device may periodically check periodically whether a wireless power reception device that is currently performing BLE communication using the first communication module 1600*a*, namely, a NFC communication module, is continuously located in a power transmission area in which the BLE communication module is disposed. In other words, in case of using out-of-band communication as in the case of BLE, even when the wireless power reception device is not located in the power transmission area, the control unit 112 does not recognize the position change, and thus power may be continuously supplied to the wireless power reception device through the transmission coil. Therefore, in such a case, it may be possible to check whether the wireless power reception device is located in the power transmission area, using the first communication module, namely, the NFC communication module, even in a state that power is being transferred to the wireless power reception device.

For example, in a state of transmitting wireless power to the first wireless power reception device 200*a* (refer to FIG. 22B) located in the first power transmission area 1600*a*, the control unit 112 checks whether the first wireless power reception device 200*a* is located in the first power transmission area at a predetermined period (or at any time or in real time) using the first communication module 1200*a* (or NFC communication module). At this time, a Bluetooth address of the wireless power reception device located in the first power transmission area 1600*a* is received through communication between the first communication module 1200*a* and the first wireless power reception device 200*a*. The control unit 112 may compare the received Bluetooth address with a Bluetooth address of the counterpart device currently in communication with the second communication module (or Bluetooth communication module 1200*b*) to check whether the first wireless power reception device is located in the transmission area 1600*a*. In other words, when the Bluetooth address of the wireless power reception device located in the first power transmission area 1600*a* through the first communication module 1200*a* is different from that of the counterpart device currently in communication with the second communication module 1200*b*, the control unit 112 may determine that the first wireless power reception device 200*a* is not located in the first power transmission area 1600*a*. Here, the first wireless power reception device denotes a device that has been receiving wireless power in the first power transmission area 1600*a*.

For another example, when the Bluetooth address of the wireless power reception device located in the first power transmission area 1600*a* is not received through the first communication module 1200*a*, the control unit 112 may determine that the first wireless power reception device 200*a* is not located in the first wireless power reception device 200*a*. Here, the first wireless power reception device denotes a device that has been receiving wireless power in the first power transmission area 1600*a*.

On the other hand, as a result of the check, when the first wireless power reception device 200*a* is not located in the first power transmission area 1600*a*, the control unit 112 may terminate communication between the second wireless communication apparatus 1200*b* and the first wireless power reception device 200*a* and wireless power transmission through a transmission coil.

As described above, according to the wireless power transmission device of the present disclosure, even when Bluetooth communication with the wireless power reception device is continuously maintained, Bluetooth communication and wireless power transmission may be terminated when the wireless power reception device is not sensed in the wireless power transmission area through NFC communication.

Figure 27A:
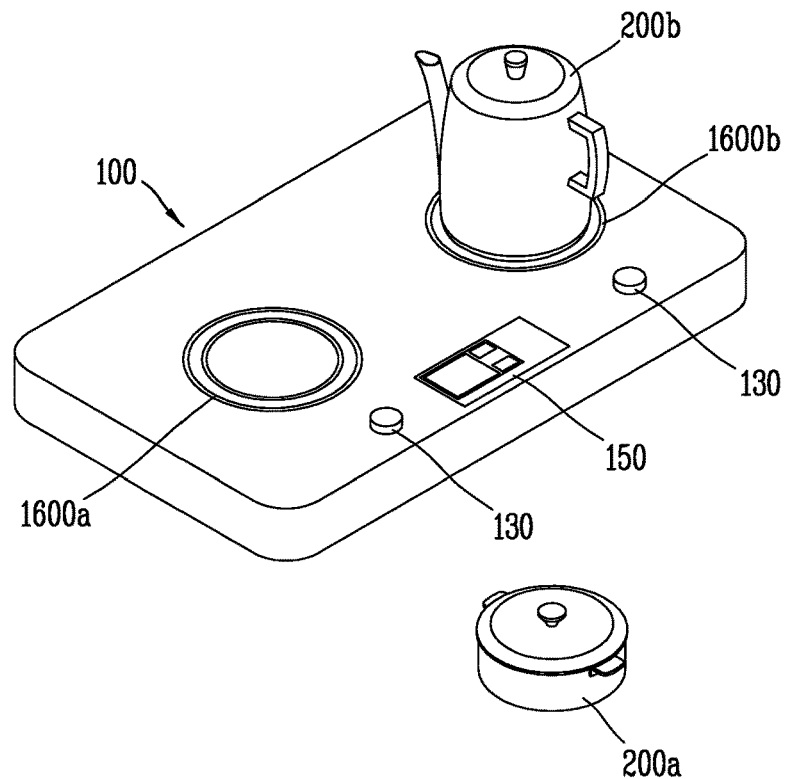
Figure 27B:
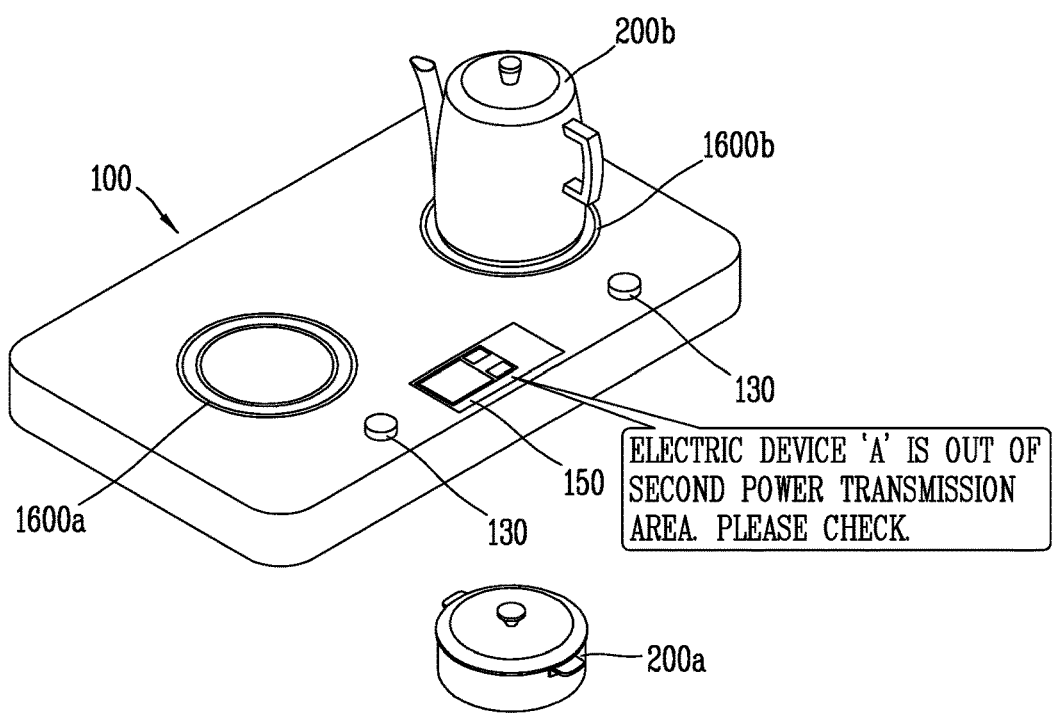

On the other hand, according to the wireless power transmission device of the present disclosure may further include an output unit configured to output at least one of visual information and auditory information as illustrated in FIG. 27A, wherein as a result of the check, when the first wireless power reception device 200*a* is not located in the first power transmission area 1600*a*, the control unit 112 may output notification information for notifying that the first wireless power device is out of the first power transmission area through the output unit.

Meanwhile, when the first wireless power reception device is not sensed in the first power transmission area for a preset period of time after it is determined that the first wireless power reception device is not located in the first power transmission area 1600*a*, the control unit 112 may terminate communication between the second communication module and the first wireless power reception device and wireless power transmission through the first transmission coil. In other words, in this case, when the first wireless power reception device is sensed in the first power transmission area within a preset period of time, the control unit 112 may continuously supply wireless power to the first wireless power reception device.

Figure 28A:
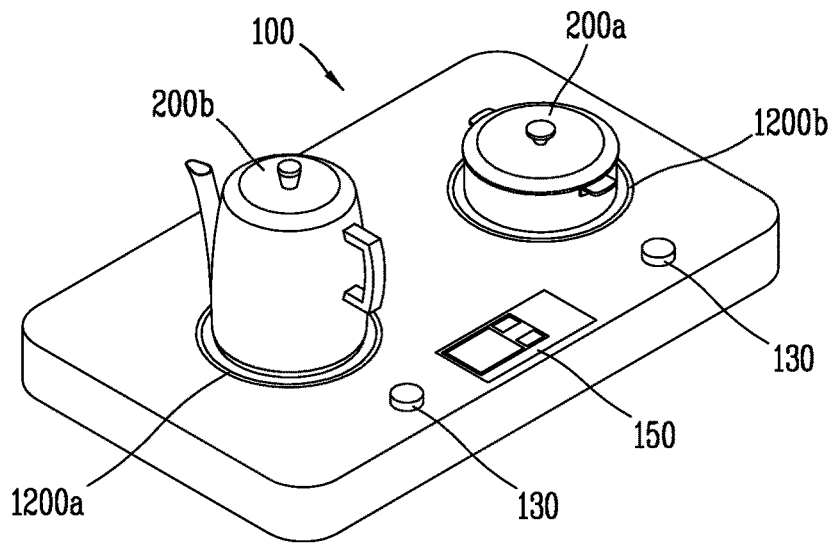
Figure 28B:
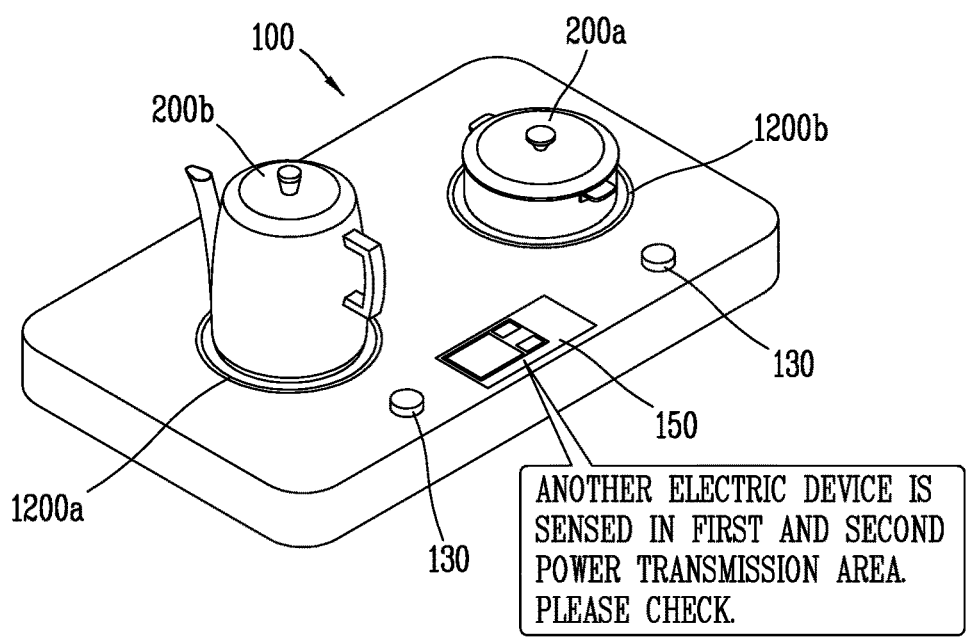

Moreover, the control unit 112 may check whether the first wireless power reception device 200a is located in the first power transmission area 1600a through the first communication module 1200a while at the same checking whether the first wireless power reception device 200a is located in a second power transmission area 1600b different from the first power transmission area 1600a as illustrated in FIG. 28A. It means a case where the first wireless power reception device 200a is located in the first power transmission area 1600a as illustrated in FIG. 27A, and then located in the second power transmission area 1600b as illustrated in FIG. 28A. Meanwhile, whether or not the first wireless power reception device 200a is located in the second power transmission area 1600b different from the first power transmission area 1600a may be sensed through the first communication module or NFC communication module disposed in the second power transmission area 1600b.

As described above, as a result of the check, when the first wireless power reception device 200a is located in the second power transmission area 1600b, the control unit 112 may control the power conversion unit to transfer power to the first wireless power reception device 200a through a second transmission coil located to correspond to the second power transmission area 1600b. In other words, even when a position where the wireless power reception device 200a is placed is changed, the control unit 112 may continuously transfer wireless power to the wireless power transmission device 200a.

For another example, as a result of the check, when the first wireless power-receiving device 200a is located in the second power transmission area 1600b, the control unit 112 may output notification information for notifying that the position of the power reception device 200a has been changed as illustrated in FIG. 28.

On the other hand, various information may be displayed on the output unit 150 of the wireless power transmission device according to the present disclosure, and for example, the output unit 150 may output at least one of state information (e.g., on operation (OFF), off operation (OFF)), current transmission power information (e.g., 1.87 kW), power consumption after power ON information (e.g., 2.5 kWh (approximately 1,600 Korean Won)), received product information (e.g., electric kettle), received product state information (e.g., under normal operation), received product communication information (e.g., NFC+BLE) and received electric power information (e.g., 1.57 kW), time information (e.g., operation is expected to end in 30 seconds).

As described above, the present disclosure may sense that a wireless power reception device is located in a wireless power transmission area through a short-range communication module, and perform communication for wireless power transmission to a wireless power reception device. In this manner, the wireless power transmission device senses the wireless power reception device through short-range communication and then proceeds with a process for wireless power transmission, and thus it may not be required to radiate a high-power current until the wireless power reception device is sensed. Accordingly, it may be possible to minimize the standby power of the wireless power transmission device

What is claimed is:

1. A wireless power transmission device, comprising:
a power conversion unit provided with a plurality of transmission coils configured to transmit wireless power and including a multiplexer for establishing and releasing a connection of at least one of the plurality of transmission coils;
a first communication module configured to sense a wireless power reception device located in any one of power transmission areas corresponding to the plurality of transmission coils, respectively;
a second communication module configured to transmit and receive a power control message to and from the wireless power reception device in response to the sensing of the wireless power reception device located in any one of the power transmission areas through the first communication module; and
a control unit configured to:
control the second communication module to receive a power control message from the wireless power reception device,
determine one or more characteristics of a frequency, voltage, and current of the power conversion unit based on the power control message including power amount information, charging state information and identification information in the wireless power reception device;
control the multiplexer to connect the at least one of the plurality of transmission coils with a reception coil of the wireless power reception device in consideration of a sensed position of the wireless power reception device; and
transfer wireless power to the wireless power reception device located in any one of power transmission areas through a transmission coil disposed to correspond to the any one of power transmission areas based on the power control message.

2. The wireless power transmission device of claim 1, wherein the first communication module is an NFC (Near Field Communication) communication module using a short-range communication method, and the second communication module is a BLUETOOTH® communication module capable of communicating with the wireless power reception device in a short-range communication network.

3. The wireless power transmission device of claim 2, wherein the first communication module is provided in the power transmission areas, respectively, to sense a corresponding wireless power reception device located in a respective power transmission area.

4. The wireless power transmission device of claim 3, wherein when a first wireless power reception device is located in a first power transmission area in which a first transmission coil among the plurality of transmission coils is disposed,
the control unit recognizes the first wireless power reception device through communication with the first communication module and an NFC tag provided in the first wireless power reception device, and controls the second communication module to transmit and receive the power control message to and from the first wireless power reception device when the recognition of the first wireless power reception device is completed, and controls the power conversion unit to transfer wireless power based on power amount information of the first wireless power reception device contained in the power control message.

5. The wireless power transmission device of claim 4, wherein the control unit checks whether the first wireless power reception device is located in the first power transmission area at preset periods using the first communication module in a state of transmitting wireless power to the first wireless power reception device.

6. The wireless power transmission device of claim 5, wherein the control unit checks whether the first wireless power reception device is located in the first power transmission area by receiving a BLUETOOTH address of a wireless power reception device located in the first power transmission area at the preset periods; and comparing the received BLUETOOTH address with a BLUETOOTH address of a wireless power reception device in communication with the second communication module.

7. The wireless power transmission device of claim 6, wherein when the BLUETOOTH address of the wireless power reception device located in the first power transmission area is different from the BLUETOOTH address of the wireless power reception device in communication with the second communication module through the first communication module, the control unit determines that the first wireless power reception device is not located in the first power transmission area.

8. The wireless power transmission device of claim 6, wherein when the BLUETOOTH address of the wireless power reception device located in the first power transmission area is not received through the first communication module, the control unit determines that the first wireless power reception device is not located in the first power transmission area.

9. The wireless power transmission device of claim 8, wherein when the first wireless power reception device is not located in the first power transmission area as a result of the check, the control unit terminates communication between the second communication module and the first wireless power reception device and wireless power transmission through the first transmission coil.

10. The wireless power transmission device of claim 6, wherein when the first wireless power reception device is not sensed in the first power transmission area for a preset period of time after it is determined that the first wireless power reception device is not located in the first power transmission area, the control unit terminates communication between the second communication module and the first wireless power reception device and wireless power transmission through the first transmission coil.

11. The wireless power transmission device of claim 6, wherein the control unit checks whether a wireless power reception device is in a second power transmission area different from the first power transmission area while at the same time checking whether the first wireless power reception device is located in the first power transmission area at the preset periods.

12. The wireless power transmission device of claim 11, wherein when the first wireless power reception device is located in the second power transmission area as a result of the check, the control unit controls the power conversion unit to transfer power to the first wireless power reception device through a second transmission coil located to correspond to the second power transmission area.

13. The wireless power transmission device of claim 6, further comprising:
an output unit configured to output at least one of visual information and auditory information,
wherein when the first wireless power reception device is not located in the first power transmission area as a result of the check, the control unit outputs notification information for notifying that the first wireless power device is out of the first power transmission area.

14. The wireless power transmission device of claim 13, wherein when the wireless power reception device is located in the power transmission area as a result of the check, the control unit switches the standby mode to a wakeup mode in which the power conversion unit and the second communication module are activated.

15. The wireless power transmission device of claim 1, wherein the control unit checks whether the wireless power reception device is located in the power transmission area using the first communication module in a standby mode in which the power conversion unit and the second communication module are deactivated.

* * * * *